(12) United States Patent
Grieselhuber et al.

(10) Patent No.: US 8,943,039 B1
(45) Date of Patent: Jan. 27, 2015

(54) CENTRALIZED WEB-BASED SOFTWARE SOLUTION FOR SEARCH ENGINE OPTIMIZATION

(71) Applicant: Covario, Inc., San Diego, CA (US)

(72) Inventors: Ray Grieselhuber, Mountain View, CA (US); Brian Bartell, San Diego, CA (US); Dema Zlotin, La Jolla, CA (US); Russ Mann, Temecula, CA (US); Pete Dudchenko, San Diego, CA (US); Patrick Hall, San Diego, CA (US)

(73) Assignee: RioSoft Holdings, Inc., San Diego, CA (US)

( * ) Notice: Subject to any disclaimer, the term of this patent is extended or adjusted under 35 U.S.C. 154(b) by 0 days.

(21) Appl. No.: 13/668,133

(22) Filed: Nov. 2, 2012

Related U.S. Application Data

(63) Continuation-in-part of application No. 12/970,781, filed on Dec. 16, 2010, now Pat. No. 8,473,495, which is a continuation of application No. 11/689,406, filed on Mar. 21, 2007, now Pat. No. 7,877,392.

(60) Provisional application No. 60/868,702, filed on Dec. 5, 2006, provisional application No. 60/823,615, filed on Aug. 25, 2006, provisional application No. 60/868,705, filed on Dec. 5, 2006.

(51) Int. Cl.
*G06F 17/30* (2006.01)

(52) U.S. Cl.
CPC .............................. *G06F 17/30867* (2013.01)
USPC ............ 707/709; 707/713; 707/726; 707/748

(58) Field of Classification Search
CPC .................... G06F 17/30899; G06F 17/30935
USPC ........................ 707/709–710, 713, 726, 748
See application file for complete search history.

(56) References Cited

U.S. PATENT DOCUMENTS

| 6,401,075 | B1 | 6/2002 | Mason et al. |
| 6,654,725 | B1 | 11/2003 | Langheinrich et al. |
| 6,810,356 | B1 | 10/2004 | Garcia-Franco et al. |
| 6,925,442 | B1 | 8/2005 | Shapira et al. |
| 7,013,323 | B1 * | 3/2006 | Thomas et al. ............... 709/203 |

(Continued)

FOREIGN PATENT DOCUMENTS

| WO | WO 2004003701 | 1/2004 |
| WO | WO 2004079551 | 9/2004 |
| WO | WO 2005052755 | 6/2005 |

OTHER PUBLICATIONS

PCT/US07/062736 International Search Report and Written Opinion mailed Oct. 2, 2007.

(Continued)

*Primary Examiner* — Hanh Thai
(74) *Attorney, Agent, or Firm* — Cooley LLP

(57) ABSTRACT

A system and method for modifying a parameter of a website in order to optimize an organic listing of the website at one or more search engines is described. Several embodiments include methods and systems for generating scored representations based upon different portions of data associated with a website, and then combining the scored representations to achieve a result. The result indicates a feature of the website that may be modified in order to optimize the organic ranking of the website at one or more search engines.

18 Claims, 19 Drawing Sheets

(56) References Cited

U.S. PATENT DOCUMENTS

| | | | |
|---|---|---|---|
| 7,043,450 | B2 | 5/2006 | Velez et al. |
| 7,185,085 | B2 | 2/2007 | Bean |
| 7,206,838 | B2 | 4/2007 | Boyd et al. |
| 7,225,246 | B2 | 5/2007 | Shapira |
| 7,343,412 | B1 | 3/2008 | Zimowski |
| 7,660,815 | B1* | 2/2010 | Scofield et al. ......... 707/999.102 |
| 7,685,192 | B1* | 3/2010 | Scofield et al. ............... 707/709 |
| 7,774,335 | B1* | 8/2010 | Scofield et al. ............... 707/709 |
| 7,779,147 | B1* | 8/2010 | Wang et al. .................... 709/235 |
| 7,797,421 | B1* | 9/2010 | Scofield et al. ............... 709/224 |
| 7,809,801 | B1* | 10/2010 | Wang et al. .................... 709/217 |
| 7,831,582 | B1* | 11/2010 | Scofield et al. ............... 707/706 |
| 7,860,895 | B1* | 12/2010 | Scofield et al. ............... 707/802 |
| 7,877,392 | B2 | 1/2011 | Grieselhuber et al. |
| 8,386,310 | B2* | 2/2013 | Weyer et al. ............... 705/14.41 |
| 8,386,509 | B1* | 2/2013 | Scofield et al. ............... 707/769 |
| 2002/0016786 | A1* | 2/2002 | Pitkow et al. ..................... 707/3 |
| 2002/0032608 | A1 | 3/2002 | Kanter |
| 2002/0073199 | A1 | 6/2002 | Levine et al. |
| 2002/0082901 | A1 | 6/2002 | Dunning et al. |
| 2002/0083188 | A1 | 6/2002 | Hericy et al. |
| 2002/0112048 | A1 | 8/2002 | Gruyer et al. |
| 2002/0154163 | A1 | 10/2002 | Melchner |
| 2002/0161648 | A1 | 10/2002 | Mason et al. |
| 2003/0014519 | A1 | 1/2003 | Bowers et al. |
| 2003/0046389 | A1* | 3/2003 | Thieme ......................... 709/224 |
| 2003/0061232 | A1 | 3/2003 | Patterson |
| 2003/0074252 | A1 | 4/2003 | Chandler-Pepelnjak et al. |
| 2003/0105677 | A1 | 6/2003 | Skinner |
| 2003/0172349 | A1 | 9/2003 | Katayama et al. |
| 2003/0208578 | A1 | 11/2003 | Taraborelli et al. |
| 2004/0059625 | A1 | 3/2004 | Schrader |
| 2004/0093259 | A1 | 5/2004 | Pych |
| 2004/0107137 | A1 | 6/2004 | Skinner |
| 2004/0148307 | A1 | 7/2004 | Rempell |
| 2004/0181457 | A1 | 9/2004 | Biebesheimer et al. |
| 2004/0215509 | A1 | 10/2004 | Perry |
| 2004/0215515 | A1 | 10/2004 | Perry |
| 2004/0225562 | A1 | 11/2004 | Turner |
| 2005/0010475 | A1 | 1/2005 | Perkowski et al. |
| 2005/0065928 | A1 | 3/2005 | Mortensen et al. |
| 2005/0137939 | A1 | 6/2005 | Calabria et al. |
| 2005/0144064 | A1 | 6/2005 | Calabria et al. |
| 2005/0149396 | A1 | 7/2005 | Horowitz et al. |
| 2005/0209920 | A1 | 9/2005 | Stubbs et al. |
| 2005/0234953 | A1 | 10/2005 | Zhang et al. |
| 2005/0256954 | A1 | 11/2005 | Shapira et al. |
| 2005/0262050 | A1 | 11/2005 | Fagin et al. |
| 2005/0288954 | A1 | 12/2005 | McCarthy et al. |
| 2006/0026128 | A1 | 2/2006 | Bier |
| 2006/0041480 | A1 | 2/2006 | Briggs |
| 2006/0069663 | A1 | 3/2006 | Adar et al. |
| 2006/0080239 | A1 | 4/2006 | Hartog |
| 2006/0080321 | A1 | 4/2006 | Horn et al. |
| 2006/0085408 | A1 | 4/2006 | Morsa |
| 2006/0117002 | A1* | 6/2006 | Swen ................................. 707/4 |
| 2006/0129453 | A1 | 6/2006 | Gardner et al. |
| 2006/0167749 | A1 | 7/2006 | Pitkow et al. |
| 2006/0173822 | A1 | 8/2006 | Watson et al. |
| 2006/0253345 | A1* | 11/2006 | Heber ............................. 705/27 |
| 2007/0027754 | A1 | 2/2007 | Collins et al. |
| 2007/0027762 | A1 | 2/2007 | Collins et al. |
| 2007/0038608 | A1 | 2/2007 | Chen |
| 2007/0067217 | A1 | 3/2007 | Schacter et al. |
| 2007/0067331 | A1 | 3/2007 | Schacter et al. |
| 2007/0112959 | A1 | 5/2007 | Bean |
| 2007/0156621 | A1 | 7/2007 | Wright et al. |
| 2007/0203789 | A1 | 8/2007 | Jain et al. |
| 2007/0233566 | A1 | 10/2007 | Zlotin et al. |
| 2007/0255754 | A1 | 11/2007 | Gheel |
| 2007/0288454 | A1 | 12/2007 | Bolivar et al. |
| 2007/0288514 | A1 | 12/2007 | Reitter et al. |
| 2008/0010142 | A1 | 1/2008 | O'Brien et al. |
| 2008/0052278 | A1 | 2/2008 | Zlotin et al. |
| 2008/0071767 | A1 | 3/2008 | Grieselhuber et al. |
| 2008/0104113 | A1* | 5/2008 | Wong et al. ................. 707/104.1 |
| 2008/0109318 | A1 | 5/2008 | Szmanda |
| 2008/0133500 | A1 | 6/2008 | Edwards et al. |
| 2010/0114862 | A1* | 5/2010 | Young et al. ................... 707/709 |
| 2011/0320461 | A1 | 12/2011 | Grieselhuber et al. |
| 2012/0290950 | A1* | 11/2012 | Rapaport et al. ............... 715/753 |
| 2013/0054556 | A1* | 2/2013 | Donnelly ...................... 707/706 |
| 2013/0054619 | A1* | 2/2013 | Liu ............................... 707/748 |
| 2013/0173574 | A1* | 7/2013 | Park et al. ..................... 707/706 |

OTHER PUBLICATIONS

U.S. Appl. No. 11/678,002 Non-Final Rejection mailed Feb. 1, 2012.
U.S. Appl. No. 11/758,592 Non-Final Rejection mailed Sep. 1, 2011.
U.S. Appl. No. 11/758,592 Final Rejection mailed Sep. 19, 2012.
PCT/US07/076798 International Search Report and Written Opinion mailed Oct. 30, 2008.
U.S. Appl. No. 13/428,975 Non-Final Rejection mailed Aug. 2, 2012.
U.S. Appl. No. 13/428,975 Final Rejection mailed Mar. 12, 2013.
U.S. Appl. No. 11/689,406 Non-Final Rejection mailed Apr. 15, 2009.
U.S. Appl. No. 11/689,414 Final Rejection mailed Jul. 30, 2009.
U.S. Appl. No. 11/689,406 Non-Final Rejection mailed Oct. 26, 2009.
U.S. Appl. No. 11/689,406 Final Rejection mailed Apr. 27, 2010.
PCT/US07/086552 International Search Report and Written Opinion mailed Oct. 31, 2008.
U.S. Appl. No. 12/970,781 Non-Final Rejection mailed Feb. 14, 2012.
U.S. Appl. No. 12/970,781 Final Rejection mailed Sep. 28, 2012.
U.S. Appl. No. 11/689,414 Final Rejection mailed May 20, 2009.
U.S. Appl. No. 11/689,414 Non-Final Rejection mailed Jan. 8, 2009.
PCT/US07/086553 International Search Report and Written Opinion mailed Nov. 3, 2008.
U.S. Appl. No. 12/329,391 Non-Final Rejection mailed Dec. 22, 2010.
U.S. Appl. No. 12/329,391 Final Rejection mailed May 24, 2011.
U.S. Appl. No. 12/329,391 Non-Final Rejection mailed Dec. 21, 2011.
U.S. Appl. No. 12/329,391 Non-Final Rejection mailed May 29, 2012.
Boggs, C., "Do You Know the Breakdown of Your Cometitors' Paid and Organic Traffic? Hitwise Does," The Search Engine Roundtable. Mar. 18, 2008. RustyBrick. May 22, 2012 http://www.seroundtable.com/archives/016591.html>.
"Covario Receives First Patent for Web-based Software Solution for SEO," San Diego, Jan. 27, 2011.
"Covario Ups Audit Score Predictabilty for Assessing SEO Health Three-Fold," San Diego, Feb. 2, 2011.
http://www.covario.com/who-we-are/newsroom/press-releases-2011-2/coke-is-it-facebook-fans-like-coca-cola-best-according-to-covario-social-media-study-of-top-100-advertisers/undefined/.
Jutla et al., "Developing Internet E-Commerce Benchmarks" In Systems Archive. vol. 24, Issue 6 (Sep. 1999) Special issue on information systems support for electronic commerce, p. 475-493. Year of Publ. 1999 [retrieved on Jul. 17, 2007]. Retrieved from the internet, URL: http://www.e-gov.gr/local/ism-egov/resources-egov/information%20Systems%20-Developing%20Internet%20eCommerce%20Benchmarks.pdf>.
Leyva et al., "Algorithmic SEO," Covario, Jan. 2011.
"Links and Local Drive Next-Gen SEO Software From Covario," San Diego, Jun. 6, 2011.
MacDonald "Covario's Search Engine Optimization Audit Score v3.0—A Technical paper on How it is Derived," Jan. 2011.
MacDonald "The Health Plan for SEO: Ranking the Top 100 Multichannel Marketers on SEO Success," Covario, Mar. 2010.

(56) References Cited

OTHER PUBLICATIONS

MacDonald and Smithers, "Does Facebook Like Your Brand?—A White Paper on brand presentation for top global advertisers, best practices to improve, and how Facebook search works" *Covario*, Oct. 20, 2011.

Newman, D. G. et al. "Rate of Return Analysis," Engineering Economic Analysis, 9th ed, New York, Oxford UP, 2004, p. 238.

Wilson, B., "The Machine Learning Dictionary," Cse.unsw.edu.au. University of Southern Wales, Aug. 30, 2000. Web. Dec. 6, 2010 <http://www.cse.unsw.edu.au/~billw/mIdict.html>.

"Covario Cross Media Dashboard Provides Analytics for Online and Offline Attribution Analysis with Addition of Broadcast Media Insight," San Diego, Feb. 2, 2011.

* cited by examiner

■ SITES  *Note: Recent Data Collected for Jan 1 - 15, 2006*

10 per page  Sites 1- 20 of 10  First | Previous | Next | Last

| Sites ▲ | Audit Summary | Average SE Referral Traffic | Average Indexed Pages | Gold Word/Phrases | | | |
|---|---|---|---|---|---|---|---|
| | | | | Score | Total | Total | Total |
| crest.com | ◐ 10 of 100 | ◐ 25% of 1,345,321 | ◐ 200 of 275 | ○ | 3 | 5 | 8 |
| febreze.com | ○ 10 of 100 | ◐ 30% of 1,345,321 | ○ 175 of 200 | ○ | 8 | 2 | 15 |
| folgers.com/uk | ○ 10 of 100 | ○ 15% of 1,345,321 | ○ 300 of 500 | ● | 10 | 5 | 5 |
| iams.com | ● 10 of 100 | ● 8% of 1,345,321 | ● 15 of 275 | ○ | 9 | 9 | 12 |
| iams.de | ○ 10 of 100 | ○ 15% of 1,345,321 | ● 200 of 210 | ● | 3 | 5 | 22 |
| iams.jp | ● 10 of 100 | ● 8% of 1,345,321 | ● 15 of 275 | ● | 9 | 9 | 12 |
| metamucil.com | ○ 10 of 100 | ○ 15% of 1,345,321 | ● 200 of 210 | ○ | 3 | 5 | 22 |
| nationalfibercouncil.org | ● 10 of 100 | ● 8% of 1,345,321 | ● 15 of 275 | ○ | 9 | 9 | 12 |
| prilosecotc.com | ○ 10 of 100 | ○ 15% of 1,345,321 | ● 200 of 210 | ● | 3 | 5 | 22 |
| ourwater.com | ● 10 of 100 | ● 8% of 1,345,321 | ● 15 of 275 | | 9 | 9 | 12 |

Sites 1- 10 of 20  First | Previous | Next | Last

CENTRALIZED WEB-BASED SOFTWARE SOLUTION FOR SEARCH ENGINE OPTIMIZATION

CROSS-REFERENCE TO RELATED APPLICATIONS

This application is a continuation in part of and claims priority to U.S. Utility patent application Ser. No. 12/970,781, entitled "Centralized Web-Based Software Solution for Search Engine Optimization," filed on Dec. 16, 2010, which is a continuation of and claims priority to U.S. Utility patent application Ser. No. 11/689,406, entitled "Centralized Web-Based Software Solution for Search Engine Optimization," filed on Mar. 21, 2007, which claims priority to U.S. Provisional Patent Application Ser. No. 60/868,702, entitled "Centralized Web-Based Software Solution for Search Engine Optimization," filed on Dec. 5, 2006, U.S. Provisional Patent Application Ser. No. 60/868,705, entitled "System and Method for Measuring the Effectiveness of an Online Advertisement Campaign," filed on Dec. 5, 2006, and to U.S. Provisional Patent Application Ser. No. 60/823,615, entitled, "System and Method for Aggregating Online Advertising Data and Providing Advertiser Services," filed on Aug. 25, 2006. This application is also related to U.S. Provisional Patent Application Ser. No. 60/778,594, entitled "System and Method for Managing Network Based Advertising Conducted by Channel Partners of an Enterprise, filed on Mar. 1, 2006. This application is related to U.S. Utility patent application Ser. No. 13/668,131, entitled "CENTRALIZED WEB-BASED SOFTWARE SOLUTION FOR SEARCH ENGINE OPTIMIZATION", filed on even date herewith. The content of each of these applications is hereby incorporated by reference herein in its entirety for all purposes.

FIELD

This disclosure relates to, among other things, methods and systems for optimization of websites ("sites") with respect to organic search results generated by search engines in response to user queries. In particular, but not by way of limitation, aspects of the disclosure pertain to one or more centralized web-based software solutions that evaluate sites and identify features of those sites that may be optimized.

BACKGROUND

With the growth of search engines, business entities (e.g., companies) are dedicating greater portions of their marketing budgets to search engine optimization (SEO) initiatives. Typically, SEO initiatives are driven by "organic" search results. In this regard, the organic listing of a website ("site") pertains to the relative ranking of that site in the algorithmic results generated by a particular search engine on the basis of particular keywords. This contrasts with sponsored or paid search results which are often listed proximate such organic search results and which list sites that have compensated the operator of the search engine for such listing. For various strategic reasons, a business entity may drive content of a site it owns or operates so that the site appears in organic search results created by one or more search engines. With respect to measuring the effectiveness of an organic SEO initiative, previously-known technology does not enable an enterprise-scale business entity (e.g., an enterprise-scale business entity) to measure the effectiveness of organic search results associated with various search engines. Furthermore, previously-known technology does not effectively allow a business entity to audit its site(s) in an automated fashion using SEO principles across many sites and across many search engines in a way that reflects enterprise-scale hierarchies of the business entity.

SUMMARY

Exemplary embodiments are shown in the drawings are summarized below. These and other embodiments are more fully described in the Detailed Description section. It is to be understood, however, that there is no intention to limit the claims to the forms described in this Summary or in the Detailed Description. One skilled in the art can recognize that there are numerous modifications, equivalents and alternative constructions that fall within the spirit and scope of the claims.

In one aspect, the disclosure relates to a system and method for modifying one or more features of a website in order to optimize the website in accordance with an organic listing of the website at one or more search engines. The inventive systems and methods include using scored representations to represent different portions of data associated with a website. Such data may include, for example, data related to the construction of the website and/or data related to the traffic of one or more visitors to the website. The scored representations may be combined with each other (e.g., by way of mathematical operations, such as addition, subtraction, multiplication, division, weighting and averaging) to achieve a result that indicates a feature of the website that may be modified to optimize a ranking of the website with respect to the organic listing of the website at one or more search engines.

In one embodiment, for example, the scored representations may be combined by generating a respective weight for each of the scored representations, and then applying the respective weights to their respective scored representations. Upon applying the respective weights, the weighted scored representations may be summed to achieve an intermediate result, which is then divided by a sum of the respective weights to achieve the result that may be used to optimize a ranking of the website with respect to the organic listing of the website at one or more search engines.

In one aspect in accordance with the disclosure, a non-transitory computer-readable storage medium stores a plurality of program codes executable by a processor for implementing a method for optimizing a website. The plurality of program codes include codes for acquiring data associated with the website, and identifying, based upon the acquired data, sections of the website to be modified to improve an audit score associated with the website. The identifying includes identifying first keyword spaces including one or more defined keywords, where the identifying the first keyword spaces is based on an amount of referral traffic associated with each of the first keyword spaces to the website and competitor websites; identifying one or more second keyword spaces of the first keyword spaces, the second keyword spaces being characterized in that no competitor sites control more than a first threshold amount of the associated referral traffic; and identifying one or more sections of the website to be modified. The sections of the website to be modified are identified based upon at least one of one or more keywords included within one or more of the second keyword spaces, and the amount of the referral traffic.

In another aspect in accordance with the disclosure, a method for optimizing a website includes acquiring data associated with the website, and identifying with a processor, based upon the acquired data, sections of the website to be modified to improve an audit score associated with the website. The identifying includes identifying first keyword spaces including one or more defined keywords, where the identifying the first keyword spaces is based on an amount of referral traffic associated with each of the first keyword spaces to the website and competitor websites; identifying one or more second keyword spaces of the first keyword spaces, the second keyword spaces being characterized in that no competitor sites control more than a first threshold amount of the associated referral traffic; and identifying one or more sections of the website to be modified. The sections of the website to be modified are identified based upon at least one of one or more keywords included within one or more of the second keyword spaces, and the amount of the referral traffic.

BRIEF DESCRIPTION OF THE DRAWINGS

Various objects and advantages and a more complete understanding of the disclosure are apparent and more readily appreciated by reference to the following Detailed Description and to the appended claims when taken in conjunction with the accompanying Drawings wherein:

FIG. 4 illustrates a first user interface that may be presented to a user when representing client-pertinent metrics developed during linear and/or non-linear combinations;

DETAILED DESCRIPTION OF EMBODIMENTS

This disclosure relates to, among other things, methods and systems for optimization of websites ("sites") to enhance organic search results generated by search engines in response to user queries. Several embodiments pertain to one or more centralized web-based software solutions that evaluate the effectiveness of search engine optimization (SEO) with respect to sites of a business entity. More specifically, embodiments of the software solutions may evaluate adherence to SEO best practices, track organic rankings of a site with respect to one or more search engines, determine one or more particular improvements for enhancing the organic rankings of the site, implement the one or more particular improvements, and/or develop one or more reports for display on a user interface.

Figure 1:
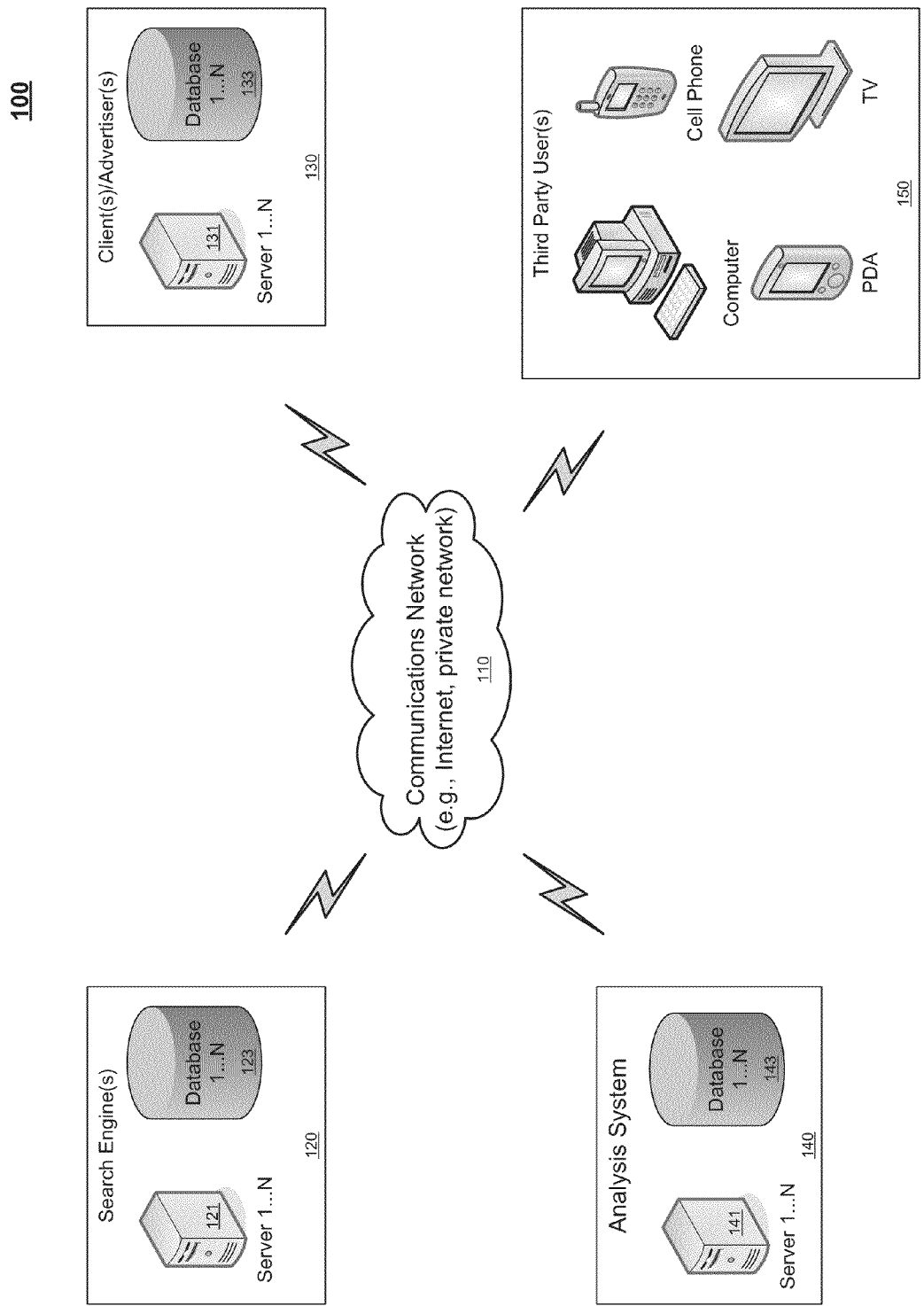
FIG. 1 shows a block diagram depicting a typical network system for analyzing search engine optimization effectiveness of a website.

Aspects of the disclosed system are designed to operate on computer systems, servers, and/or other like devices. While the details of the disclosed embodiments may vary and still be within the scope of the claims, FIG. 1 shows a block diagram depicting a typical network system 100 for analyzing SEO effectiveness of a site. The network system 100 is only one example of a suitable computing environment and is not intended to suggest any limitation as to the scope of use or functionality of the disclosed system. Neither should the network system 100 be interpreted as having any dependency or requirement relating to any one or combination of components illustrated in the exemplary network system 100.

Aspects of the disclosed system and method may be described in the general context of computer-executable instructions, such as program modules, being executed by a computer or server. Generally, program modules include routines, programs, objects, components, data structures, and the like that perform particular tasks or implement particular abstract data types. The disclosed system and method may also be practiced in distributed computing environments where tasks are performed by remote processing devices that are linked through a communications network. In a distributed computing environment, program modules may be located in both local and remote computer storage media including memory storage devices.

As is shown, the network system 100 includes a communications network 110, such as the Internet or a private network, capable of providing communication between devices at search engine(s) 120, advertiser/client(s) 130, an SEO analysis system 140, and third party user(s) 150 described hereinafter. The devices of FIG. 1 communicate with each other via any number of methods known in the art, including wired and wireless communication pathways.

As shown in FIG. 1, a search engine 120 is accessible by a third party user 150, a client 130, and by the analysis system 140. The third party user 150 may utilize any number of computing devices that are configured to retrieve information from the World Wide Web ("WWW"), such as a computer, a personal digital assistant (PDA), a cell phone, a television (TV), and other network communications-enabled devices. The client 130 is typically a business entity with one or more websites that are to be indexed by a search engine 120 or a social network. The analysis system 140 operates one or more servers 141 capable of Internet-based communication with the search engine 120 and the client 130. As is discussed below, the modeling system 140 enables the client 130 to model the effectiveness of an SEO initiative with respect to other SEO initiatives of the client 130 or entities other than the clients 130. It is a feature of the disclosed embodiments that these models enable the client 130 to quickly identify marketing inefficiencies and/or opportunities.

As those skilled in the art will appreciate, various intermediary network routing and other elements between the communication network 110 and the devices depicted in FIG. 1 have been omitted for the sake of simplicity. Such intermediary elements may include, for example, the public-switched telephone network (PSTN), gateways or other server devices, and other network infrastructure provided by Internet service providers (ISPs).

Figure 2:
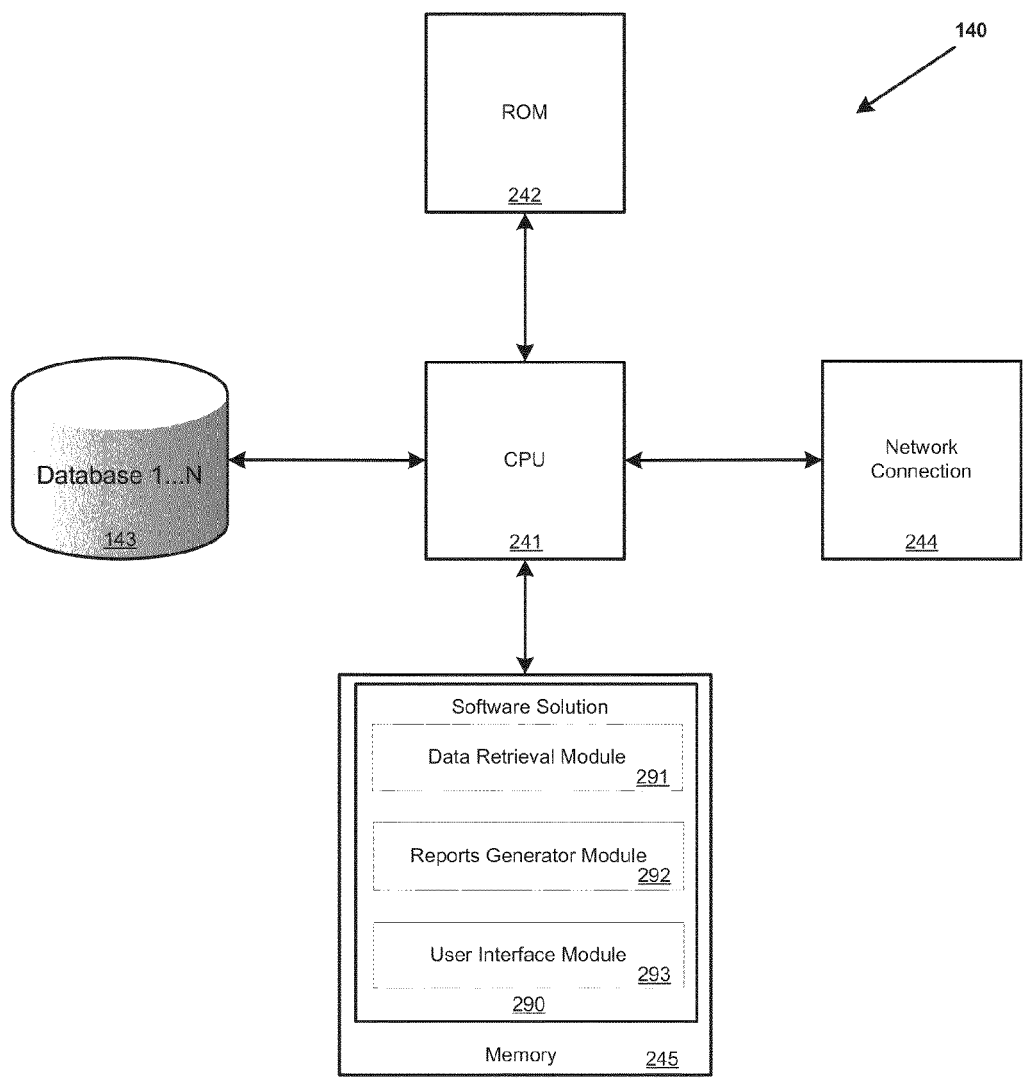
FIG. 2 illustrates one implementation of a search engine optimization analysis system.

Attention is now drawn to FIG. 2, which depicts one implementation of the analysis system 140. As is shown, the analysis system 140 may include, but not by way of limitation, a processor 241 coupled to ROM 242, the database 143, a network connection 244, and memory 245 (e.g., random access memory (RAM)).

The database 143 is described herein in several implementations as hard disk drive for convenience, but this is certainly not required, and one of ordinary skill in the art will recognize that other storage media may be utilized without departing from the scope of the claims. In addition, one of ordinary skill in the art will recognize that the database 143, which is depicted for convenience as a single storage device, may be realized by multiple (e.g., distributed) storage devices.

As shown, a software solution 290 includes a data retrieval module 291, a report generator module 292, and a user interface ("UI") module 293, all of which are implemented in software and are executed from the memory 245 by the processor 241. The solution 290 can be configured to operate on personal computers (e.g., handheld, notebook or desktop), servers or any device capable of processing instructions embodied in executable code. Moreover, one of ordinary skill in the art will recognize that alternative embodiments, which implement one or more components in hardware, are well within the scope of the claims. Each module 291-293 is associated with one or more disclosed functions described herein.

Basic Operation of the Software Solution

In general terms, the solution 290 analyzes the construction of a website ("site") for any possible aspect of that site's construction that would affect the site's organic ranking with respect to one or more search engines. The solution 290 may make recommendations regarding improvements with respect to the site's construction. For example, the solution 290 may make recommendations based on the size of one or more webpages ("pages") belonging to a site. Alternative recommendations may pertain to whether keywords are embedded in a page's title, meta content and/or headers. The solution 290 may also make recommendations based on traffic referrals from search engines or traffic-related data from directories and media outlets with respect to the organic ranking of a site. Media outlets may include data feeds, results from an API call and imports of files received as reports offline (i.e., not over the Internet) that pertain to Internet traffic patterns and the like. One of skill in the art will appreciate alternative recommendations.

Figure 3:
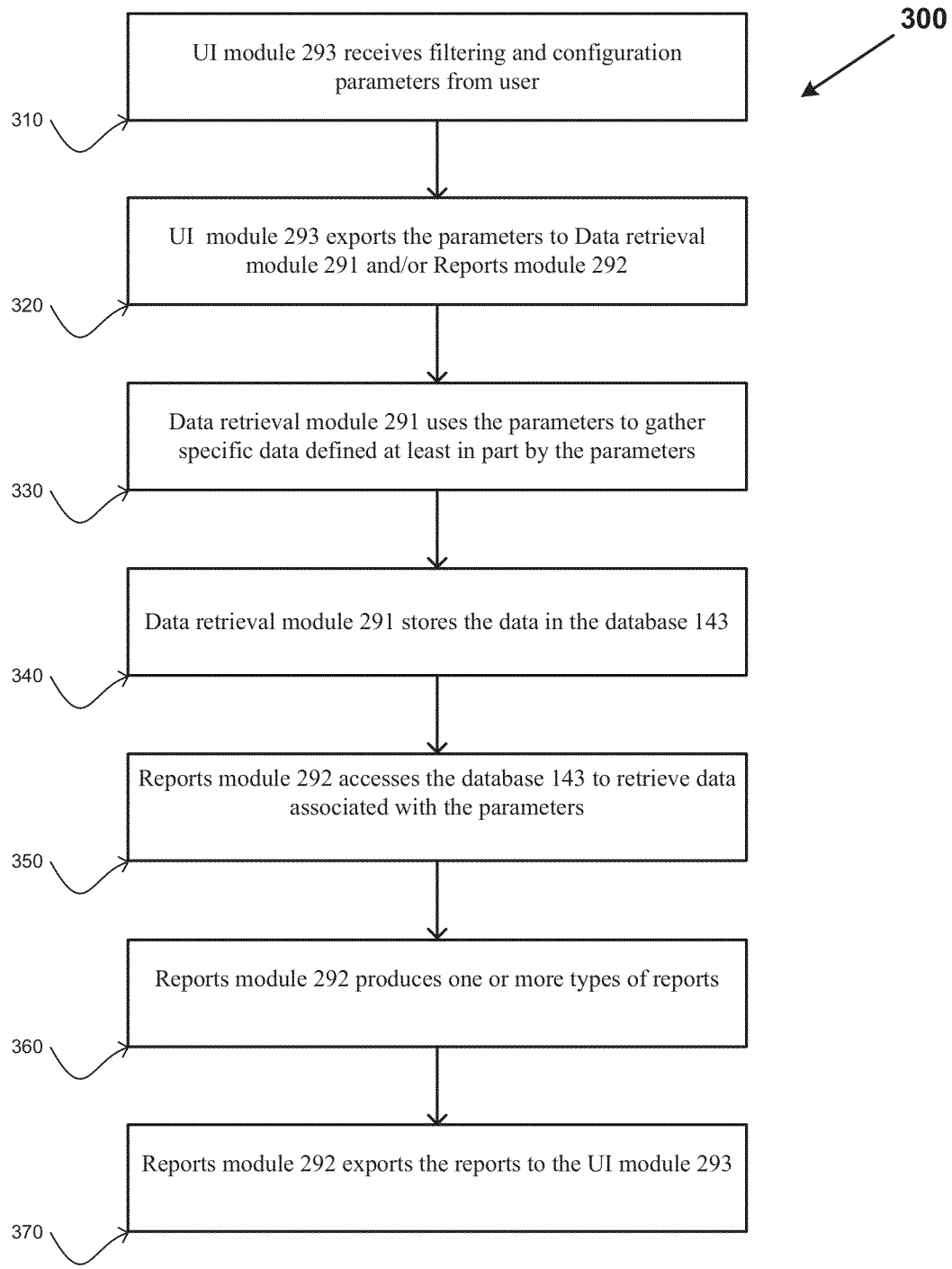
FIG. 3 depicts a process flow diagram illustrating steps taken by a software solution in accordance with an embodiment.

The modules 291-293 operate in concert with each other to perform certain functions of the solution 290. By way of example, FIG. 3 depicts a process flow diagram 300 illustrating steps taken by the solution 290 in accordance with an embodiment. As shown in step 310, the UI module 293 may receive filtering and configuration parameters from a user (e.g., a system administrator, the client 130, etc.). The UI module 293, in step 320, may export those parameters to the data retrieval module 291 and/or the reports generator module 292. The parameters may pertain to system administration parameters that apply to general implementations of the solution 290 (e.g., pre-configured data collection) or to user parameters that apply to specific implementations of the solution 290 (e.g., real-time data collection). The data retrieval module 291, in step 330, uses the parameters to gather specific data defined at least in part by the parameters. The data retrieval module 291 may gather data from one or more search engine files, one or more content source files (e.g., video, image, document and various other non-html files), one or more web files associated with the client(s) 130, and/or one or more web analytics system files. Upon gathering data, the data retrieval module 291, in step 340, stores the data in the database 143. The reports generator module 292, in step 350, accesses the database 143 to retrieve data associated with the parameters, and then, in step 360, produces one or more types of reports. In step 370, the generated reports are exported to the UI module 293, which displays one or more visual representations of the reports to the user.

Data Retrieval Module

The data retrieval module 291 gathers data for use by the reports generator module 292 in generating one or more reports that are visually represented via the UI module 293. The data may be gathered from any number of sources, including by way of example, one or more search engines (e.g., the search engines 120), one or more content sources (e.g., one or more videos, images and/or documents such as .pdf, .doc, and .xls files, among others)), one or more sites associated with the client(s) 130, one or more social media networks or blogs, and/or one or more web analytics systems.

For example, the data collected by the data retrieval module 291 may include traffic levels from one or more search engines to one or more pages of one or more sites. Collected data may also include a number of pages for one or more sites that are indexed by one or more search engines or social networks, and whether particular keywords exist in the indexing. The data retrieval module 291 may also collect data associated with an indexed page's category, title, description, and URL with respect to the one or more search engines or social networks. Alternatively or additionally, data pertaining to whether one or more keywords are found in a page's title, meta content and/or headers may be collected. Collected data may also include a total number of pages for one or more sites, and whether a sitemap link exists on the home page(s) of one or more sites.

The data retrieval module 291 may alternatively or additionally collect page-level data, including URL character length, page size, keyword density, existence of flash navigation, existence of JavaScript navigation, existence of page errors, and existence of header tags, among others. One of skill in the art will recognize that the data retrieval module 291 may collect data specific to any type of page, including preferred landing pages.

Additional data collected by the data retrieval module 291 may include rankings or a number of ranked positions of one or more pages or sites with respect to one or more organic search engine results that are based on one or more search terms (e.g., one or more keywords) during one or more time periods.

One of skill in the art will appreciate alternative forms of data may be gathered by the data retrieval module 291 including, for example, additional web analytics data and/or data accessible via application programming interfaces (APIs) associated with search engines.

Report Generator Module

Attention is drawn to the reports generator module 292 of FIG. 2, which functions to receive parameters from the UI module 293, retrieve data from the database 143, generate one or more reports based on the parameters and the retrieved data, and then send the generated reports to the UI module 293. The generation of reports may be automated (e.g., the generation of reports occurs at specified time intervals). When generating the reports, the reports generator module 292 may use one or more linear and/or non-linear combinations involving one or more scored representations to achieve quantifiable metrics pertinent to the client 130.

A combination may include, by way of example, a mathematical operation such as addition, subtraction, multiplication, division, weighting, and averaging, among others.

A scored representation may include, but not by way of limitation, an alphanumeric representation of data collected by the data retrieval module 291 (e.g., 0, 1, 2, . . . , n and a, b, c, . . . z) and/or an alphanumeric representation of a resultant value derived from one or more linear/non-linear combinations.

A quantifiable metric may be, for example, indicative of a parameter or feature of a site that may be modified to optimize the site with respect to an organic ranking of the site at a search engine. By way of example, in one embodiment a feature may reflect an inefficient or an unrealized use of a keyword with respect of the site's paid or organic ranking in search engine results. In another embodiment, a feature may reflect an undesired visitor traffic pattern on the site following a selection of the site by the visitor from a listing of search results at a search engine. In yet another embodiment, a feature may reflect the existence of any number of aspects relating to a site, including accessibility-related aspects, site construction-related aspects, and/or search engine-related aspects. For example, accessibility-related aspects may reflect whether a sitemap exists on the site's homepage and/or whether the site exists in a Yahoo! and/or DMOZ (i.e., the Open Directory Project) directory. Site construction-related aspects may reflect exceeded page sizes, exceeded URL character lengths, lack of flash navigation, lack of header tags, lack of a keyword in header tags, lack of a keyword is a page title, and/or lack of a keyword in page meta content. Search engine-related aspects may reflect a ranking of a site or pages of the site in organic and/or paid search results of one or more search engines. One of skill in the art will appreciate various other features that may be indicated using configurable metrics, including any of the 'Collected Data' described below with respect to Table 1.

As stated above, the reports generator module 292 may employ computations that are configurable in terms of scored representations and combinations. For example, a first scored representation may be weighted, a second scored representation may be weighted, the resultant weighted scored representations may be summed to achieve a summed result, and the summed result may be divided by a sum of the weights. In such a case, the reports generator module 292 employs four combinations: 1) the weighting of the first scored representation, 2) the weighting of the second scored representation, 3) the summing of the two weighted scored representations, and 4) the dividing of the summed weighted scored representations by the sum of the weights. One of skill in the art will appreciate that any number of combinations of any number of scored representations may be used to quantify metrics pertinent to the client 130. By way of example, Table 1 displays a listing of data, scored representations of such data, and weights applied to the scored representations.

TABLE 1

| Collected Data | | Scored Representations | | Weights |
|---|---|---|---|---|
| whether a sitemap link exists on site's home page | $V_1$ | Existence: 1; No existence: 0 | $w_1$ | 5 |
| whether a site exists in a directory (e.g., Yahoo!) | $V_2$ | Existence: 1; No existence: 0 | $w_2$ | 4 |
| whether a site exists in a directory (e.g., DMOZ) | $V_3$ | Existence: 1; No existence: 0 | $w_3$ | 4 |
| whether a site exists in a directory (e.g., Yahoo!), and a keyword does or does not exist in the description of the site in the directory | $V_4$ | Existence of both: 1; Existence of site only: 0.75; No existence of site: 0 | $w_4$ | 4 if both exist, 2 if only the site exists |
| whether a site exists in a directory (e.g., DMOZ), and a keyword does or does not exist in the description of the site in the directory | $V_5$ | Existence of both: 1; Existence of site only: 0.75; No existence of site: 0 | $w_5$ | 4 if both exist, 2 if only the site exists |
| whether HTML parseable or page access errors exist for a particular page | $V_6$ | No existence of errors: 1 HTML error exists without access error: 0.5 Existence of access error: 0 | $w_6$ | 5 if no errors, 3 if HTML error exists without access error |
| whether the character length of a particular page's URL exceeds a reconfigurable length (e.g., 255 characters) | $V_7$ | Does not exceed length: 1; Exceeds length: 0 | $w_7$ | ? (need input) |

TABLE 1-continued

| Collected Data | | Scored Representations | | Weights |
| --- | --- | --- | --- | --- |
| whether the size of a particular page falls within a reconfigurable size range (e.g., <100K, 100-200K, >200K) | $V_8$ | page size < 100K: 1; page size of 100-200K: 0.5; page size > 200K: 0 | $w_8$ | 1 if <100K, 3 if 100-200K |
| whether flash navigation exists on a page and whether the characters on the page exceed a reconfigurable number (e.g., 150 characters) | $V_9$ | No flash: 1; Flash & length exceeded: 1; Flash & length not exceeded: 0; | $w_9$ | 2 |
| whether a JavaScript (JS) link to a page external to a site or to a page of the site that is listed in the sitemap exists for a particular page, or whether a JavaScript link to a page of the site that is not listed in the sitemap exists, or whether a reconfigurable percentage of the site has JavaScript links | $V_{10}$ | Existence of JS link to external page or sitemapped page: 1; No existence of above & existence of JS link to non-sitemapped page: 0; JS link percentage exceed : 0 | $w_{10}$ | 2 |
| whether H1 header tags exist on a particular page | $V_{11}$ | Existence: 1; No existence: 0 | $w_{11}$ | 5 |
| whether H2 header tags exist on a particular page | $V_{12}$ | Existence: 1; No existence: 0 | $w_{12}$ | 4 |
| whether H3 header tags exist on a particular page | $V_{13}$ | Existence: 1; No existence: 0 | $w_{13}$ | 2 |
| whether a particular keyword exists in the title of a particular page | $V_{14}$ | Existence: 1; No existence: 0 | $w_{14}$ | 5 |
| whether a particular keyword exists in the meta content of a particular page | $V_{15}$ | Existence: 1; No existence: 0 | $w_{15}$ | 4 |
| whether a particular keyword exists in the H1-H3 header of a particular page | $V_{16}$ | Existence: 1; No existence: 0 | $w_{16}$ | 5 if H1, 4 if H2 and no H1, 2 if only H3 |
| ranking of the top-ranked page for a particular keyword and for a particular search engine (e.g., Yahoo!, MSN, Google) | $V_{17}$ | [$1^{st}$]: 1.0; [$2^{nd}$]: 0.917; [$3^{rd}$]: 0.833; [$4^{th}$]: 0.75; [$5^{th}$]: 0.708; [$6^{th}$]: 0.667; [$7^{th}$]: 0.625; [$8^{th}$]: 0.583; [$9^{th}$]: 0.542; [$10^{th}$]: 0.5; [$11^{th}$]: 0.476; [$12^{th}$]: 0.452; [$13^{th}$]: 0.429; [$14^{th}$]: 0.405; [$15^{th}$]: 0.381; [$16^{th}$]: 0.357; [$17^{th}$]: 0.333; [$18^{th}$]: 0.310; [$19^{th}$]: 0.286; [$20^{th}$]: 0.262; [$21^{st}$]: 0.238; [$22^{nd}$]: 0.214; [$23^{rd}$]: 0.191; [$24^{th}$]: 0.167; [$25^{th}$]: 0.143; [$26^{th}$]: 0.119; [$27^{th}$]: 0.095; [$28^{th}$]: 0.071; [$29^{th}$]: 0.048; [$30^{th}$]: 0.024; [$31^{st}$ and above]: 0.0 | $w_{17}$ | 1 |
| Check for existence of title tags, use of keywords in title tag, and uniqueness of title tag across site. | $V_{18}$ | Exists, is unique, and has keywords: 1; Exists and has keywords: .66; Exists: .33; Doesn't exist: 0 | $w_{18}$ | 5 |
| Check for existence of meta tags, use of keywords in meta tags | $V_{19}$ | Exists and has keywords: 1; Exists: .5; Doesn't Exist: 0 | $w_{19}$ | 4 |
| Check for existence of body tag and content in the body tag. | $V_{20}$ | Exists and has content: 1; Doesn't exist and doesn't have content: 0 | $W_{20}$ | 3 |
| Keyword density (KWD) score to check how many keywords are used in text vs. all words in text (within configurable desired range). | $V_{21}$ | 1 if KWD >=7%, .5 if KWD<7% and >=2% and 0 if KWD<2% | $W_{21}$ | 5 |
| Keyword emphasis (KWE) score to check how many times a keywords is emphasized in the website with bold type, italics, underscore, etc., versus the total number of times the keyword is used in the website, or versus other emphasized and/or non-emphasized words in the website (within configurable desired range). | $V_{22}$ | 1 if KWE >25%, .5 if KWE<=5% and >10% and 0 if KWE<=10% | $W_{22}$ | 3 |

TABLE 1-continued

| Collected Data | | Scored Representations | | Weights |
|---|---|---|---|---|
| whether there are HTTP errors when accessing the page / site | $V_{23}$ | No errors: 1; Errors: 0 | $W_{23}$ | 5 |
| whether there are session ids in the URL of a page | $V_{24}$ | No session IDs: 1; Session IDs exist: 0 | $W_{24}$ | 3 |
| whether there are dynamic (HTTP) parameters in the URL of a site. | $V_{25}$ | No Dynamic Parameters: 1; Dynamic Parameters Exist: 0 | $W_{25}$ | 2 |
| Inbound link analysis for EDU domains | $V_{26}$ | 1 if number of inbound links exists above a configurable threshold equaling a number of acceptable inbound links from the EDU domain, 0 if not above threshold | $W_{26}$ | 5 |
| Inbound Link analysis for GOV domains | $V_{27}$ | 1 if number of inbound links exists above a configurable threshold equaling a number of acceptable inbound links from the GOV domain, 0 if not above threshold | $W_{27}$ | 5 |
| Inbound link analysis for all inbound links | $V_{28}$ | 1 if number of inbound links exists above a configurable threshold equaling a number of acceptable inbound links from all sources, 0 if not above threshold | $W_{28}$ | 4 |
| Inbound link analysis from social networks (deLicio.us, Digg, etc.) | $V_{29}$ | 1 if number of inbound links exists above a configurable threshold equaling a number of acceptable inbound links from the social network(s), 0 if not above threshold | $W_{29}$ | 4 |
| Inbound link analysis from vertical search engines (Technorati, etc.) | $V_{30}$ | 1 if number of inbound links exists above a configurable threshold equaling a number of acceptable inbound links from the vertical search engine(s), 0 if not above threshold | $W_{30}$ | 4 |
| Inbound link analysis from wikis (Wikipedia, etc.) | $V_{31}$ | 1 if number of inbound links exists above a configurable threshold equaling a number of acceptable inbound links from the wiki(s), 0 if not above threshold | $W_{31}$ | 4 |
| Inbound link analysis from blogs | $V_{32}$ | 1 if number of inbound links exists above a configurable threshold equaling a number of acceptable inbound links from the blog(s), 0 if not above threshold | $W_{32}$ | 4 |
| Internal link analysis — links between pages on site and keyword optimization for internal links | $V_{33}$ | 1 if exists and links with keyword as link text, .5 if exists, and 0 if no internal links to a given page. | $W_{33}$ | 3 |
| whether there are keywords in the URL of a page | $V_{34}$ | No keywords: 0; keywords exist: 1 | $W_{34}$ | 4 |
| the number of directories a page is from the domain (e.g.,http://www.domain.com/first_directory/second_directory) | $V_{35}$ | domain itself: 1; one directory away: .75; two directories away: .5; three directories away: .25; four or greater directories away: 0.0 | $W_{35}$ | 2 |
| whether a page loads within a range of acceptable load times | $V_{36}$ | 1 if the page loads in a range of times between t1 and t2 | $W_{36}$ | 2 |
| the number of times select keywords are mentioned in social media pages and/or blogs and the sentiment indicated by the message | $V_{37}$ | 1 for each instance having a positive sentiment, 0.5 for each instance having a neutral sentiment and -1.0 for each instance having a negative sentiment | $W_{37}$ | 1 |
| the number of followers of owned or earned social media pages and/or blogs | $V_{38}$ | 1 for each follower of specified social media pages and/or blogs owned by the client or earned (i.e., not sponsored by the client) | $W_{38}$ | 1 |
| the number of engagements of users with owned or earned social media pages and/or blogs | $V_{39}$ | 1 for each engagement (likes, tweets and Google +1's) of a user with social media pages and/or blogs owned or earned | $W_{39}$ | 1 |

As shown in Table 1, scored representation $V_1$ represents whether a sitemap link exists on the home page of a site. If a sitemap exists, a scored representation of "1" is used to represent $V_1$. Otherwise, if a sitemap does not exist, a scored representation of "0" is used to represent $V_1$. In either case, a weight $w_1$ (e.g., "5") may be applied to the scored representation.

The scored representations may be represented by any type of strength or grading indicator (e.g., alphanumeric representations, color-coding). Each scored representation, as well as combinations of scored representations may be weighted with adjustable weights (e.g., rational numbers) configurable via the UI module 293.

By way of example, Table 2 presents a listing of combinations.

TABLE 2

Combinations

| | |
|---|---|
| $C_1$ | $[(V_1)^*(w_1) + (V_4)^*(w_4) + (V_5)^*(w_5)] / [(w_1) ? (w_4) ? (w_5)]+$ |
| $C_2$ | $[(V_{14})^*(w_{14}) + (V_{15})^*(w_{15})? (V_{16})^*(w_{16})] / [(w_{14}) + (w_{15}) + (w_{16})]$ |
| $C_3$ | Average of $C_2$ for selected keywords |
| $C_4$ | $[(V_6)^*(w_6) + (V_7)^*(w_7) + (V_8)^*(w_8) + (V_9)^*(w_9) +$ |
| | $(V_{10})^*(w_{10}) + (V_{11})^*(w_{11}) + (V_{12})^*(w_{12}) + (V_{13})^*(w_{13}) +$ |
| | $(C_3)^*(w_{c3})] / [(w_6) + (w_7) + (w_8) + (w_9) + (w_{10}) + (w_{11}) +$ |
| | $(w_{12}) + (w_{13}) + (w_{c3})]$ |
| $C_5$ | Average of $C_3$ for selected pages |
| $C_6$ | $[(C_1)^*(W_{c1}) + (C_5)^*(W_{c5})] / [(W_{c1}) + (w_{c5})]$ |
| $C_7$ | Average of $V_{17}$ for selected search engines |
| $C_8$ | Average of $C_7$ for selected keywords |
| | New Combination? |

As shown in Table 2, combination $C_1$ is formed by dividing the sum of weighted scored representations $w_1V_1$, $w_4V_4$ and $w_5V_5$ by the sum of the scored representations weights $w_1$, $w_4$ and $w_5$. One of skill in the art will appreciated that combinations may be used as scored representations in other combinations. For example, combinations $C_1$ and $C_5$ are used as scored representations in combination $C_6$, and combination $C_3$ is used as a scored representation in combination $C_4$. One of skill in the art will also appreciate that combinations used as scored representations in other combinations may be weighted. For example, weight $w_{c3}$ may be any negative or positive rational number (e.g., 5), weight $w_{c1}$ may be any negative or positive rational number (e.g., 3), and weight $w_{c5}$ may be any negative or positive rational number (e.g., 5).

One of skill in the art will recognize alternative combinations than those shown in Table 2. Additionally, one of skill in the art will appreciate that combinations may be configurable, via the UI module 293, in terms of scored representations, weights and mathematical operations.

User Interface ("UI") Module

The UI module 293 receives filtering and customization parameters from a user, sends at least a portion of those parameters to the data retrieval module 291 and/or the reports generator module 292, receives one or more reports from the reports generator module 292, and displays one or more visual representations of the report(s) received from the reports generator module 292. The visual representations may be formed of alphanumerical, color-coded, graphical, image-based, or any other type of representation.

At least a portion of the filtering parameters received by the UI module 293 define the scope of data collection by the data retrieval module 291 and/or data retrieval by the reports generator 292. For example, the parameters may define the scope of data collection and/or data retrieval in terms of one or more instances or periods of time (e.g., date ranges, triggered events). Alternatively or additionally, the parameters may define the scope of data collection and/or data retrieval in terms of the types of data previously described with respect to the data retrieval module 291.

At least a portion of the customization parameters define the report(s) generated by the reports generator module 292. The customization parameters allow a user to configure the visual representation of the generated reports. Customization parameters may include parameters similar to those described above with respect to the filtering parameters. Additionally, the customization parameters may include drill-down, online analytical processing (OLAP), research and sorting parameters (e.g., ascending or descending organization), as well as display parameters (e.g., numeric, color-coded, or video/image representation display parameters).

Figure 5:
FIG. 5 illustrates a second user interface that may be presented to a user when representing client-pertinent metrics developed during linear and/or non-linear combinations.
Figure 6:
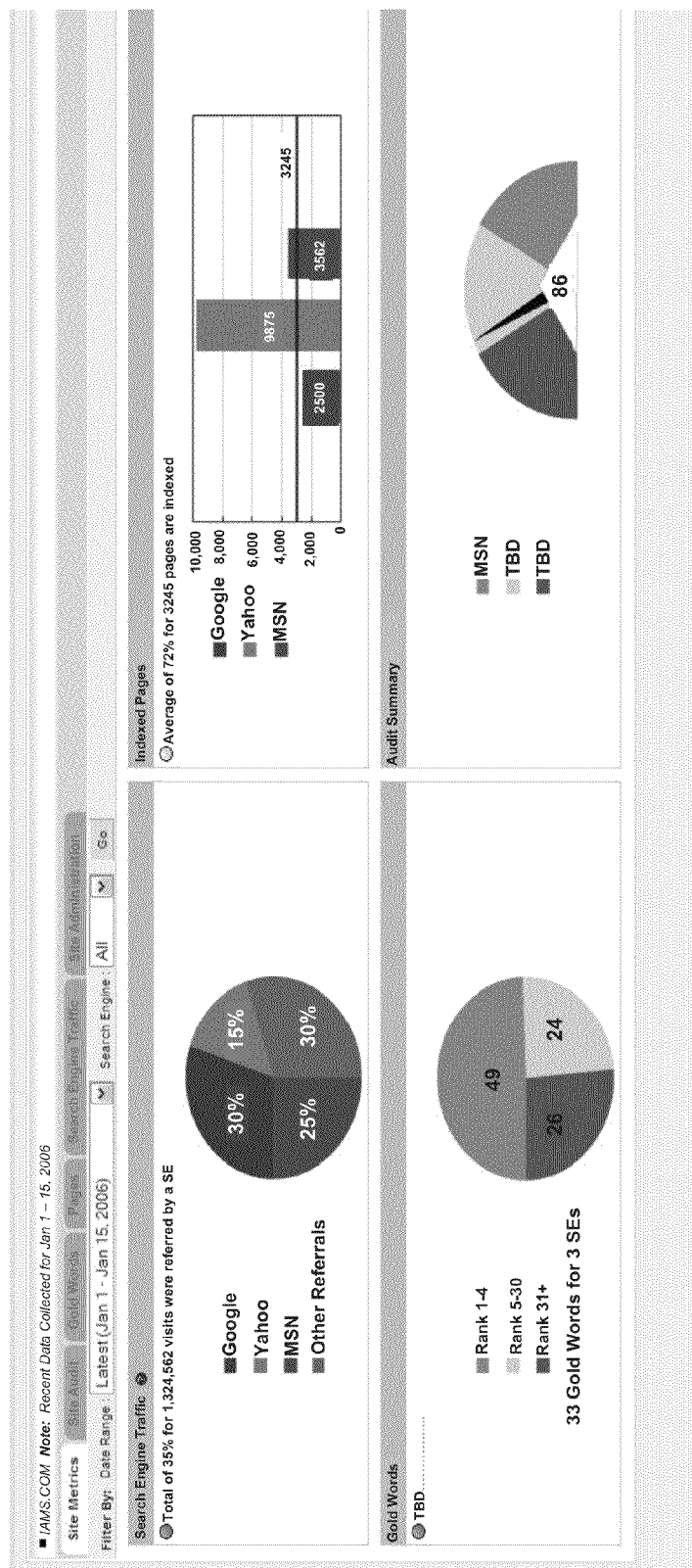
FIG. 6 illustrates a third user interface that may be presented to a user when representing client-pertinent metrics developed during linear and/or non-linear combinations in accordance with certain aspects of the disclosure.

Attention is now drawn to FIGS. 4-6, which represent different user interfaces that the UI module 293 may present to a user when representing client-pertinent metrics developed during the linear and/or non-linear combinations described above with respect to the reports generator module 292. FIG. 4 includes a table 400 that displays client-pertinent metrics with respect to multiple sites. FIG. 5 displays a table 500 that lists multiple sites and their rank with respect to multiple search engines. FIG. 6 comprises multiple charts 600 that illustrate client-pertinent metrics with respect to a single site (e.g., a site selected from the multiple sites listed in FIG. 4 or FIG. 5).

One of skill in the art will appreciate alternative embodiments wherein all or a portion of the reports generated by the reports generator module 292 are accessible by one or more computer systems/visual displays external to the analysis system 140 (e.g., via triggered or automatic emailing or other methods). One of skill in the art will also appreciate alternative embodiments in which the reports generator module 292 develops one or more reports when triggering events occur (i.e., under preconfigured circumstances).

Client Architecture

Figure 7:
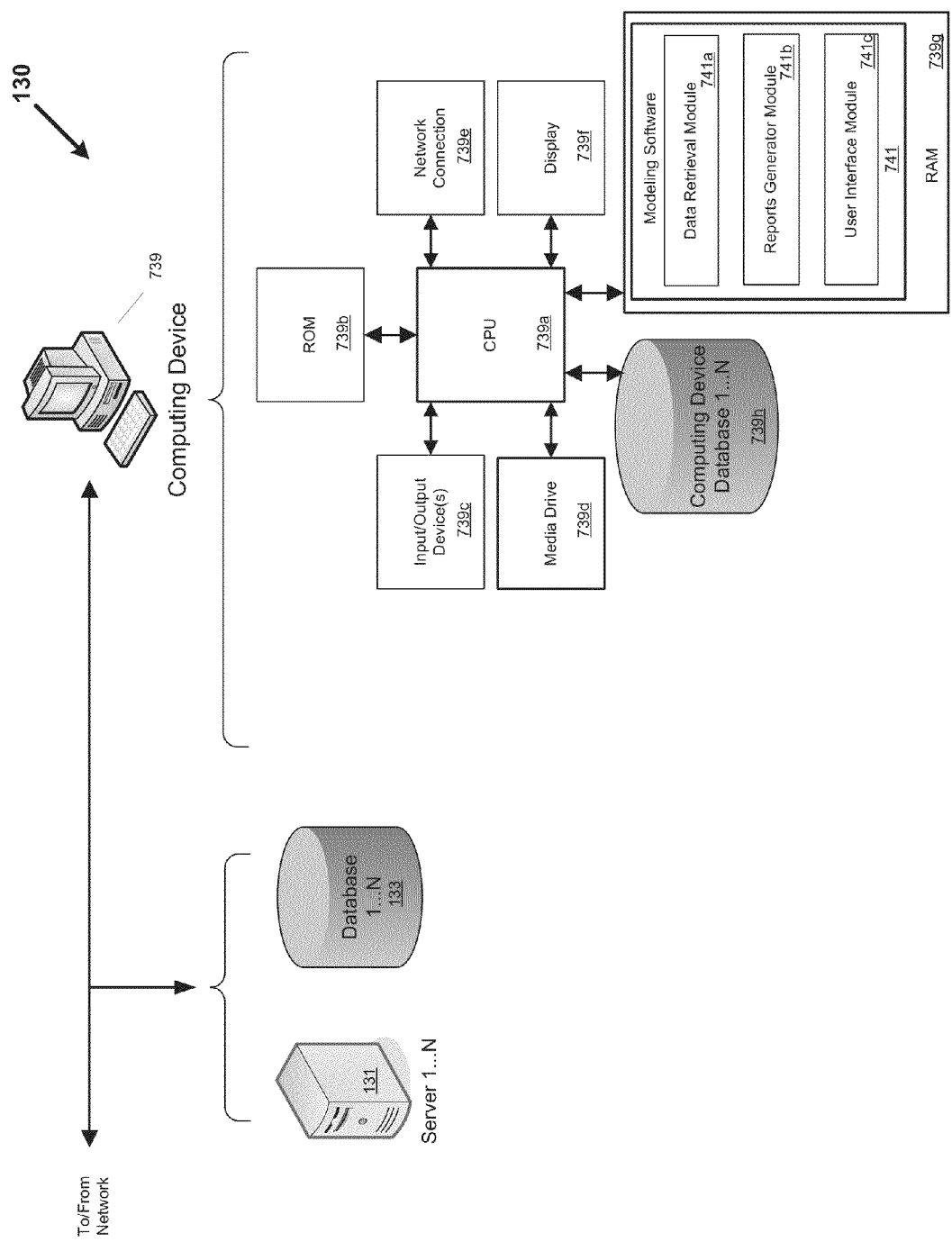
FIG. 7 shows a block diagram depicting an alternative system for analyzing search engine optimization effectiveness of a website.

Attention is now drawn to FIG. 7, which depicts an exemplary implementation of the client 130. As is shown, the client 130 includes a server 131 connected to a database 133, both of which may communicate either directly or indirectly with the communication network 110. FIG. 7 also includes a computing device/system 739 configured in accordance with one implementation. The computing device 739 may include, but not by way of limitation, a personal computer (PC), a personal digital assistant (PDA), a cell phone, a television (TV), etc., or any other device configured to send/receive data to/from the communication network 110, such as consumer electronic devices and hand-held devices.

The implementation depicted in FIG. 7 includes a processor 739a coupled to ROM 739b, input/output devices 739c (e.g., a keyboard, mouse, etc.), a media drive 739d (e.g., a disk drive, USB port, etc.), a network connection 739e, a display 739f, memory 739g (e.g., random access memory (RAM)), and a file storage device 739h.

The storage device 739h is described herein in several implementations as a hard disk drive for convenience, but this is certainly not required, and one of ordinary skill in the art will recognize that other storage media may be utilized. In addition, one of ordinary skill in the art will recognize that the storage device 739h, which is depicted for convenience as a single storage device, may be realized by multiple (e.g., distributed) storage devices.

As shown, a software solution 741 includes a data retrieval module 741a, a reports generator module 741b, a user interface module 741c, all of which are implemented in software and are executed from the memory 739g by the processor 739a. The software 741 can be configured to operate on personal computers (e.g., handheld, notebook or desktop), servers or any device capable of processing instructions embodied in executable code. Moreover, one of ordinary skill in the art will recognize that embodiments implementing one or more components in hardware may be alternatively employed. Each module 741a-c function similarly to modules 291, 292 and 293, respectively, of FIG. 2.

Page Audit Function

Figure 15:
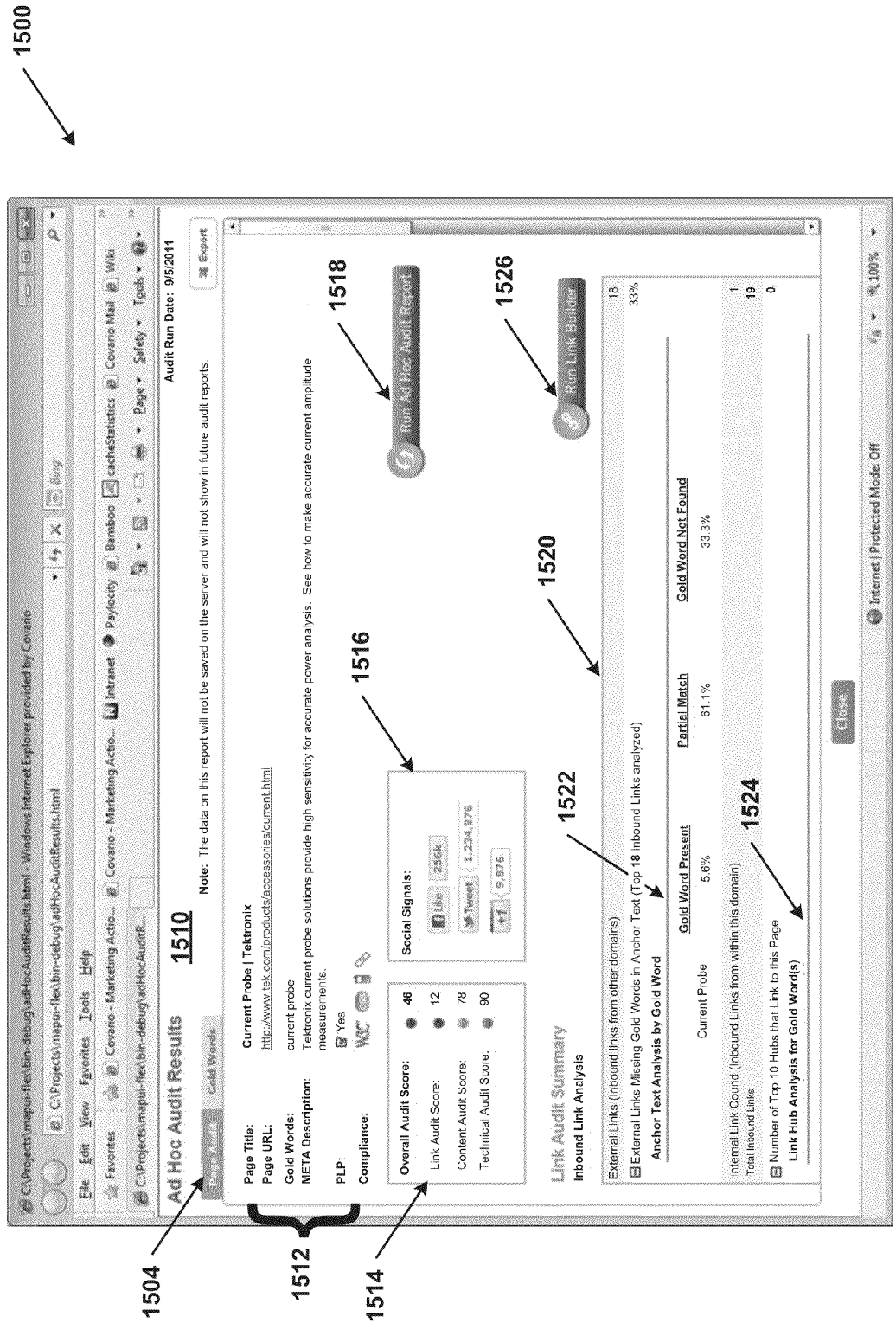
FIG. 15 shows a user interface screen displaying results of an audit of social media websites—, the results being indicative of feedback regarding a website being monitored by the search engine optimization system in accordance with the disclosure.

FIG. 15 shows a user interface screen 1500 displaying results of an adhoc audit of a selected web page. The results in the screen 1500 include an Ad Hoc Audit Results portion 1510 that displays page level results for a single page in a website. A Page Audit tab 1504 allows a user to view the illustrated portion 1510 of the screen 1500. A Gold Words tab allows a user to view another portion (not shown) of the screen 1500 that shows a selection of keywords (i.e., Gold Words in this example) that the Ad Hoc Audit Results page displays results for.

A page information portion 1512 displays information describing the selected page. The page information portion 1512 lists a page title, a page URL, Gold Words for the page, a description of the page, an indication of whether or not the page is a PLP and a compliance indicator that indicates which forms of communication can access the page (e.g., mobile devices, World Wide Web Consortium (W3C), Cascading Style Sheets (CSS), etc.

An audit score window 1514 lists the overall audit score, the link audit score, the content audit score and the technical audit score for the selected page. A social signals window 1516 lists a number of user engagements that have been found in the latest ad hoc audit. In this example, the social signals window lists the number of Facebook® Likes®, Twitter® Tweets®, Google®+1s®. A user input button 1518, labeled "Run Ad Hoc Audit Report," can be activated by a user in order to run another ad hoc audit report and update the Ad Hoc Audit Results portion 1510.

The screen 1500 also includes a Link Audit Summary portion 1520. The Link Audit Summary portion 1520 lists the number of external inbound links to the selected page from other domains, the percentage of these external links that include the Gold Words in the anchor text, the percentage of these external links that include part of the Gold Words in the anchor text, and the percentage of these external links that are missing the Gold Words in anchor text. A link hub analysis portion 1524 (partially shown) lists the top 10 Hubs that link to the page being audited.

A user input button 1526, labeled "Run Link Builder," can be activated by a user in order to run an audit of links inbound to the page so as to get an update of the link analysis information contained in the portion 1520. The screen 1500 is exemplary only and other social media information can also be displayed.

Portfolio Management

As discussed above, the data retrieval module 291 may collect data associated with an indexed page's category, title, description, and URL with respect to the one or more search engines or social networks. Alternatively or additionally, data pertaining to whether one or more keywords are found in a page's title, meta content and/or headers may be collected. Collected data may also include a total number of audited pages for one or more sites, and whether a sitemap link exists on the home page(s) of one or more sites. The data retrieval module 291 may alternatively or additionally collect page-level data, including URL character length, page size, keyword density, existence of flash navigation, existence of JavaScript navigation, existence of page errors, and existence of header tags, among others. One of skill in the art will recognize that the data retrieval module 291 may collect data specific to any type of page, including preferred landing pages.

The data collected by the data retrieval module 291 is used by the report generator module 292 to determine one or more scored representations. These scored representations can be determined when changes are made to pages of a site that is being updated and/or determined periodically. These on-going analyses are referred to herein as audits and the scored representations are referred to as audit scores. A history of audit scores is stored in the analysis system database 143. These historical audit scores are used to provide an efficient method of Portfolio Management of a website portfolio of webpages. The Portfolio Management methods described herein provide an ability to prioritize work based on the possibility of increasing the audit score the most. The Portfolio Management methods depend upon the ability to calculate an audit score and use that audit score to identify keywords or other enhancements that have more potential for increasing the audit score.

As shown in Table 1, there are at least 39 different scored representation values $V_i$ and weights $W_i$ that can be used to calculate an audit score. With so many different scored representations and weights, it can be difficult for a person to identify what has affected an audit score from one analysis to the next. For example, if an analysis system 140 uses 39 different scored valuations for each page of a website, and there are 5 sections of the website, each section with 1000 pages, this results in 195,000 potential areas that could potentially be changed to affect the audit score. This is an unmanageable number of possible items for a small workforce to handle. The Portfolio Management system described herein identifies the most lucrative areas for improvement by analyzing which areas of the website can be most influential in changing the audit score and thus improve the chances of the entire website functioning more efficiently.

The Portfolio Management system uses three factors in identifying which areas of a website are most likely to improve the chances of improving in rank. The Portfolio Management system considers three factors in making this determination. The four factors include (1) identify key word spaces that are searched frequently, (2) identify which of these key word spaces have weak competition and (3) identify which of these key word areas are characterized by low click rates in the website being managed and 4) remove any keywords where the rank is already in position number 1 organically. By considering all four of these factors when identifying which opportunities exist across all pages of all site sections for an entire website, the Portfolio Management system described herein increases the likelihood of improving the ranking of the website within organic search results compared to competitors and thus improving the performance of the website.

Referring to FIG. 4, a table 400 displays client-pertinent metrics with respect to multiple sites or sections defined within a large domain (site). Each of the sites displayed in FIG. 4 is associated with a certain key word space that has high referral traffic as evidenced by the 1,345,321 referrals made in the fifteen day period illustrated (Jan. 1-15, 2006 in this example). The list of sites in FIG. 4 includes the portions of the site being managed (iams.com, iams.de and iams.jp in this example) as well as sites from the competition. The Portfolio Management system uses the referral traffic numbers in column 3 of table 400 to identify whether or not the key word space is searched frequently by comparing the referral traffic total of U.S. Pat. No. 1,345,321 to the referral traffic of other key word spaces. The Portfolio Management system can use the percentage numbers in column 3 of table 300 to identify whether the competition is weak. For example, if none of the competitor sites have more than a threshold number of the referral traffic such as 15% for example. Lastly, the Portfolio management system can identify if the website has low click rates in this keyword area by determining if the percentage numbers of the site sections being managed (the iams sites in this example) are below a threshold level such as 5% for example. In other words, if the total query volume and visits for an entire group in a key word space is large, while no single site or domain dominates the search results (all less than 15%, for example), and, if the calculated percentage of query volume for the managed site section(s) is low (less than 5%, for example), then the managed site section is a likely candidate for improvement in the search rankings.

Referring to FIG. 5 a table 500 lists multiple sites and their rank in the preferred landing page (PLP) list with respect to multiple search engines. The Portfolio Management system can also use these PLP listings of the site sections of the website being managed to identify where improvement can most likely be made.

Figure 8:
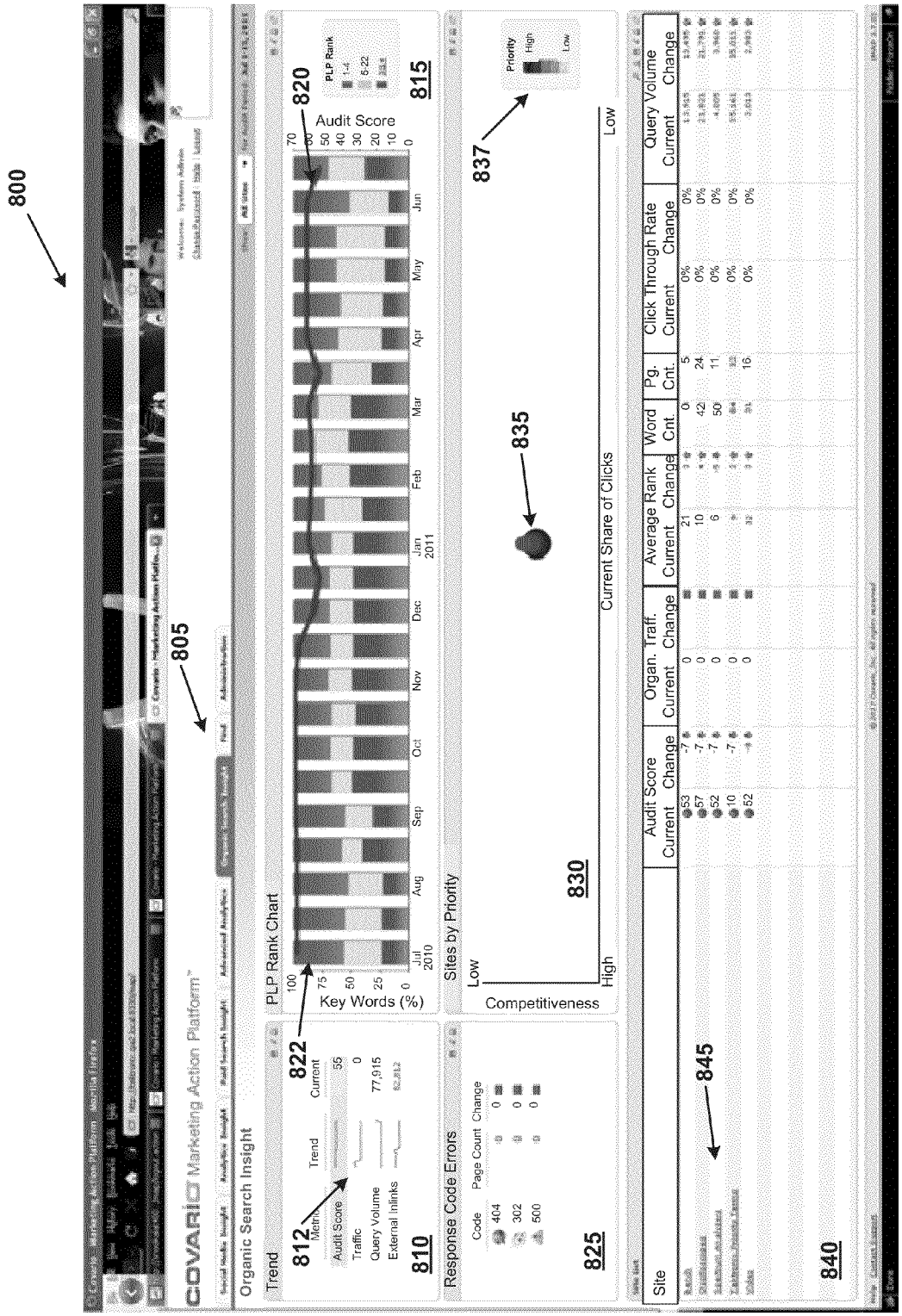
FIG. 8 shows a website level screen displaying data collected and analyzed by a Portfolio Management system in accordance with the disclosure.

FIG. 8 shows a website level screen 800 displaying data collected and analyzed by the Portfolio Management system. Screen 800 shows a historical record for various analytical metrics determined by the reports generator module 292 for the website being managed by the analysis system 140. The screen 800 includes several sections that can be used to illustrate details of the audit score, traffic, page errors and recommended areas of possible improvement. Screen 800 illustrates data that has been gathered by the data retrieval module 291 for organic search results. Other screens, as determined by the tabs 805, can display payed search results and combined search results (organic and paid) and other information.

The screen 800 includes a trend snapshot window 810, a PLP rank/trend focus window 815, a response error code window 825, a site priority window 830 and a site summary window 840. The trend snapshot window 810 displays time histories of various metrics known as Key Performance Indicators (KPIs) that the reports generation module 292 has generated based on past analyses. In the example screen 800, the time histories 812 include the audit score, traffic volume, query volume and external links (pointing towards the website) for the website being managed. In addition to the time histories 812, the trend snapshot window 810 also lists the most recent values for the audit score, traffic volume, query volume and external links.

The PLP rank/trend focus window 815 displays a graphical time history showing a columnar display 822 of PLP ranks for all websites that are displayed by one or more search engines in response to a defined set of keywords. The trend focus window 815 also displays a focused time history 820 for one of the KPIs, the audit score in this example, overlayed on the PLP ranks 822. The user can highlight one of the KPI time histories 812 in order to change the focused time history 820. The columnar PLP rankings 822 are divided into three groups, a high ranking group of the pages that rank in positions 1-4, a medium ranking group for the pages in positions 5-30 and a low ranking group for the pages that rank 31 and higher. The ranking numbers of these three groups (high, medium and low) are configurable by the user to be different ranges. The columns of the PLP rankings 822 are sized to show the percentage of key words in the defined group of keywords that each of the high, medium and low ranking groups include. The key word percentage scale is located on the left side of the graph.

The focused time history 820 is a time history of one of the trends listed in the trend snapshot window 810. The user determines which of the metrics in the trend snapshot window 810 is displayed with the focused time history 820 by highlighting that trend in the trend snapshot window 810. In this example, the audit score metric is highlighted. The user can change which metric is displayed with the focused time history 820 by highlighting that metric. The combination of the PLP rankings 822 and the focused time history 820 provides the user with a comparative glimpse of how the website being managed is doing in comparison to the other websites in the PLP rankings 822. The size of the PLP ranking columns 822 provides the user with an estimate of the percentage of keywords in the defined keyword space needed to get into the high ranking group (or the medium or low ranking groups).

The response code error window 825 displays HTTP errors for the entire website being managed. The HTTP errors include 404, 302 and 500 errors. These errors indicate to the user the number of pages in the website that are not functioning properly. The response code error window 825 also lists the change in the number of errors introduced since the last time an audit score was determined. The audit score can depend on the number of HTTP errors. The HTTP errors are also used in another portion of the analysis system 140 referred to as Continuity Management. The Continuity Management system is described below.

The site priority window 830 is a first element of the Portfolio Management system that communicates an order of prioritized recommendations to the user. The site priority window 830 displays the highest priority opportunities to improve the audit score of the website. A set of icons 835 is displayed for the sections of the website that are listed in a site list 845 in the site summary window 840.

The site list 845 is determined by the user and represents sub-sections or pages of the website being managed. In addition to showing the site list 845 listing the various sections of the website being managed, the summary window 840 lists the current values of various metrics and a change in the value of the metrics since the last audit score analysis for each of the sections of the website. In this example, the summary window 840 lists, for each section of the website, the current value and most recent change in value for each the audit score, the organic traffic, the average PLP rank, the word count, the page count, the click through rate and the query volume.

An icon 835 is displayed for each of the sections listed in the site list 845. The icons 835 are positioned in the graphical display of the site priority window 830 based on the competitiveness of the section compared to the competition (e.g., comparative audit checks) as shown on the vertical ordinate portion of the graph, and further based on the current share of clicks that the section controls versus all the clicks for the key word space including the competition as shown on the horizontal abscissa portion of the graph. In general, the Portfolio Management system will give higher priority to sections of the website that have a low share of clicks and a low competitiveness.

The priority of each of the sections is indicated, in this example, by the color of each of the individual icons 835. A priority scale 837 shows a priority ranking from low to high for 5 color levels. Different shades of a single color could be an indication of the priority. For example, if the icons 835 are different shades of blue, the lowest priority could be light blue and ever darkening shades of blue could be used for the four other priority levels with the highest priority level being the darkest shade of blue.

Figure 9:
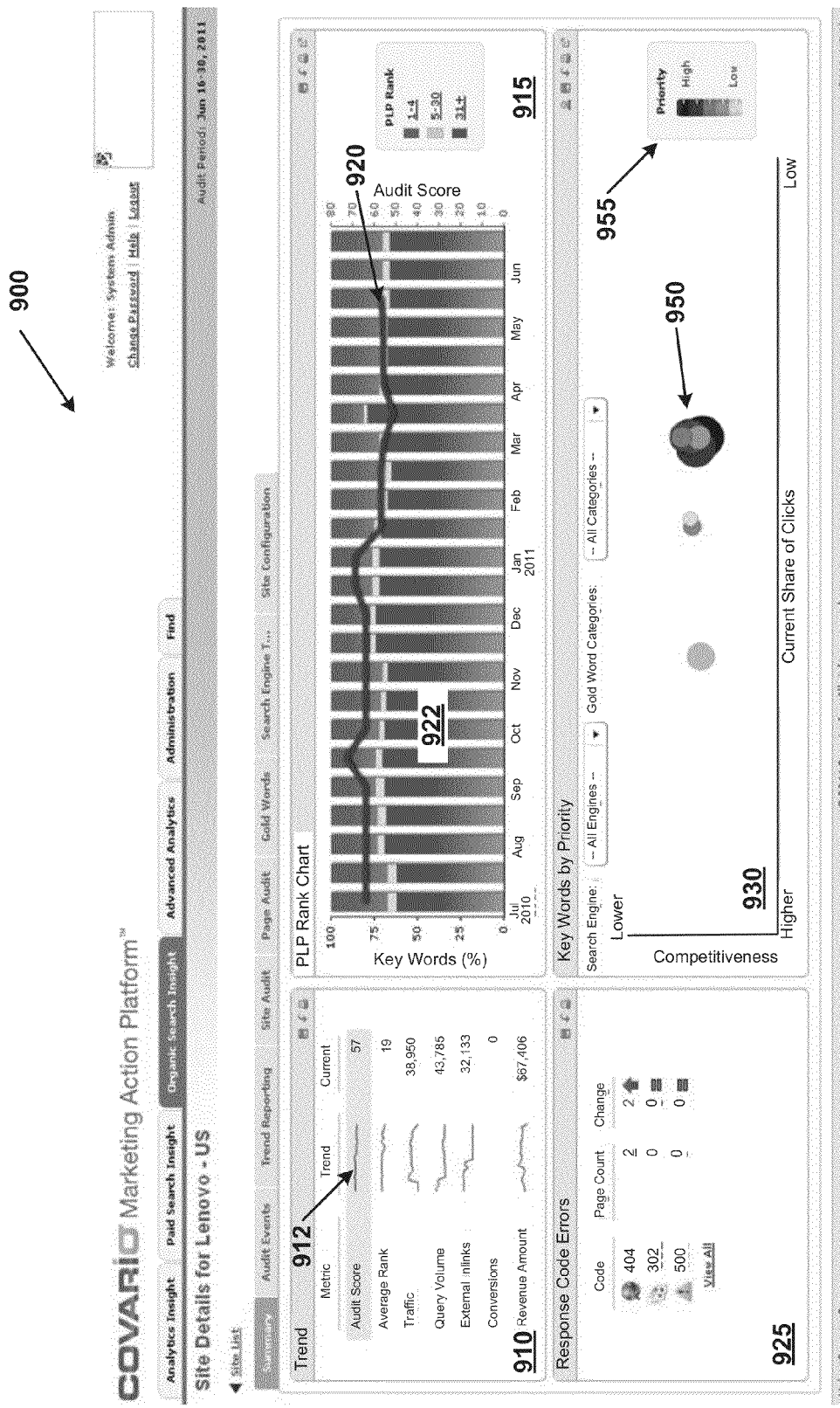
FIG. 9 shows a section level screen displaying data collected and analyzed by the Portfolio Management system in accordance with the disclosure.

A user can elect to learn more about the state of each of the sections of the website, as determined by the Portfolio Management system, by clicking on the respective icon 835 for that section of the website. When the user clicks on one of the icons 835, a section specific screen 900, as shown in FIG. 9, is displayed. The section level screen 900 shows similar sections as the website level screen 800, but only for the selected section (one of the sections listed in the site summary window 840 of FIG. 8). The section level screen 900 includes a section trend snapshot window 910, a section PLP rank/trend focused window 915, a section response code error window 925 and a section specific key word priority window 930.

The section trend snapshot window 910 displays time histories 912 of various metrics that the reports generator module 292 has generated based on past analyses for the selected section of the website. In the example screen 900, the time histories 912 include the audit score, an average PLP rank, a traffic volume, query volume, external links (pointing towards the website), conversions, and a revenue amount for the selected section of the website being managed. A conversion is a client-defined on-page action that a visitor takes while interacting with the site. A conversion could be a sale, a whitepaper download, a video view, a registration or other revenue or non-revenue based action. In addition to the time histories 912, the trend snapshot window 910 also lists the most recent values for each of these metrics.

A PLP rank/trend focus window 915 displays a graphical time history 922 showing a columnar display of PLP ranks for all websites that are displayed by one or more search engines in response to a defined set of keywords selected for the section of the website that the screen 900 pertains to. The trend focus window 915 also displays a focused time history 920 overlayed on the PLP ranks 922. The columnar PLP ranks 922 are divided into three groups in a similar fashion to the PLP ranks 822 of FIG. 8.

The focused time history 920 is a time history of one of the trends listed in the trend snapshot window 910. The user determines which of the metrics in the trend snapshot window 810 is displayed with the focused time history 920 by highlighting that trend in the trend snapshot window 910. In this example, the audit score metric is highlighted.

The response code error window 925 displays HTTP errors for the selected section of the website being managed. The HTTP errors include 404, 302 and 500 errors. These errors indicate to the user the number of pages in the website that are not functioning properly. The response code error window 825 also lists the change in the number of errors introduced since the last time an audit score was determined.

The key word priority window 930 displays the suggested list of keywords that have the greatest opportunity to focus on improving the rank position of the website and thus generating a better traffic number for the selected section of the website for the key words selected for the section of the website. A set of keyword icons 950 is displayed for the selected keywords important to the selected section of the website.

An icon 950 is displayed for each of the keywords that are deemed to be significant to the selected section. The keyword icons 950 are similar to the website section icons 835 of FIG. 8 in that they are positioned in the graphical display of the site priority window 930 based on the same competitiveness and current share of clicks for each of the key words individually. In general, the Portfolio Management system will give higher priority to keywords in which the selected section has high query volume, a low share of clicks and a low competitiveness. Rather than showing the keywords as a graphical display as icons 950 in the site priority window 930, the keywords can list the keywords in a simple table or textual grid listing the competitiveness and current share of clicks for each keyword. In one embodiment, the user can toggle between the keyword icons 950 and a table or grid by right clicking on the site priority window 930 with a mouse, for example. A user can also toggle between displaying keywords and displaying site sections icons 835.

The priority of each of the key words is indicated, in this example, by the color of each of the individual keyword icons 950. A priority scale 955 shows a priority ranking from low to high for 5 color levels. Different shades of a single color could be an indication of the priority. For example, if the icons 950 are different shades of red, the lowest priority could be light red and ever darkening shades of red could be used for the four other priority levels with the highest priority level being the darkest shade of red.

Figure 10:
FIG. 10 shows a screen displaying a prioritized list of recommendations compiled by the Portfolio Management system in accordance with the disclosure.

A user can elect to learn more about the recommended actions, based on priority, that the Portfolio Management system has identified for the selected section of the website by clicking on the respective icon 950 for one of the key words. When the user clicks on one of the keyword icons 950, a prioritized list of recommendations, as shown in FIG. 10, is displayed. Keyword recommendation screen 1000 shows a prioritized list of recommendations for the selected section of the website for the selected key word. In the example recommendation screen 1000, the Selected Keyword label 1002 indicates that the selected keyword is "Internet Marketing," and the Preferred Landing Page label 1004 indicates that the selected section of the website is "Interactive Marketing Analytics Software & Agency Services Leader-Covario." The recommendation screen 1000 shows an impact icon 1005 for each of the recommendations where the impact icon 1005 illustrates a potential impact to change the audit score, illustrated by an increasing number of columns from 1-4 in this example. An audit requirement element 1010 identifies one of the scored representation entries of Table 1. An audit result element 1015 identifies a high level reason that the recommendation was triggered by the audit while an error element 1020 identifies a lower level error that triggered the high level audit reason. Lastly, a recommendation element 1025 identifies specifics on how to resolve the recommendation. In one embodiment, the user can select one or more of the recommended actions and generate a pre-formatted note to any email address to expedite task management.

The screens 800, 900 and 1000 allow a user to start with all the sections of the website, identify the most important section to revise with the screen 800, start with 1000's of keywords and select the higher priority keywords with screen 900 in order to identify the most important recommended actions to take on those terms with screen 1000. This type of focused analysis provides a more focused workflow and increases the efficiency of an organization in optimizing a website in terms of search engine optimization, for example.

Continuity Management

As discussed above, the website screen 800 and the section screen 900 both list HTTP errors in a response code error window 825 and 925, respectively. The Portfolio Management system includes a subsystem known as a Continuity Management System. The Continuity Management System tracks HTTP errors and identifies when they were introduced to the website based upon software updates. As discussed above, the audit score can, in some aspects, track page response errors such as header 1 tag errors, header 2 tag errors, etc. The Continuity Management system allows for quick identification of causes of HTTP errors that result in lower audit scores. In addition, the Continuity Management system allows for quick identification of pages that are not accessible by searchers, thereby avoiding lost revenue or conversions as quickly as possible.

Figure 11:
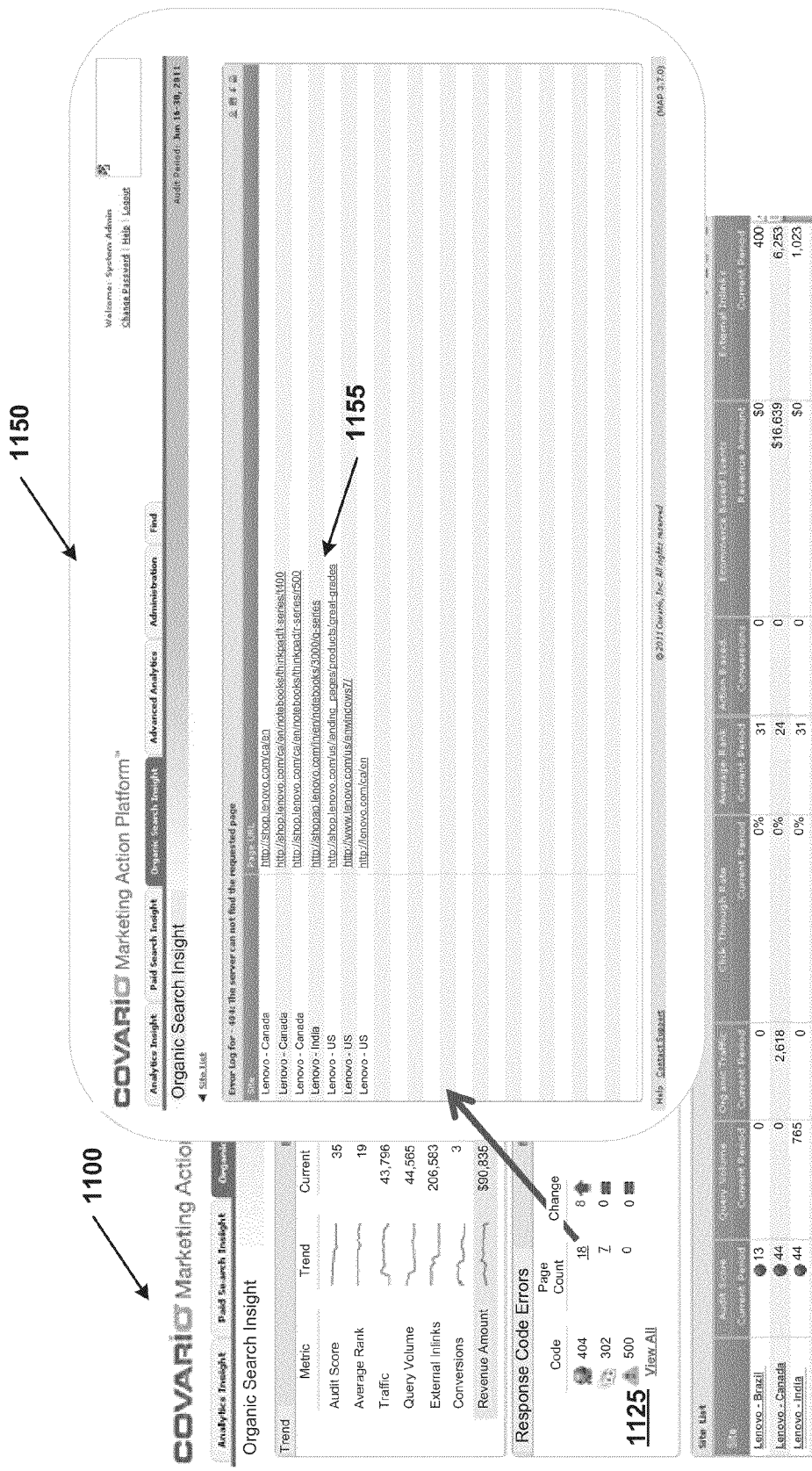
FIG. 11 shows a screen displaying an error window that shows a listing of pages in a website that lists each page suffering from a response code error as determined by a Continuity Management system in accordance with the disclosure.

FIG. 11 shows a screen 1100 that can be either a website screen 800 or a section screen 900. The screen 1100 also includes a response code error window 1125 that is similar to the response code error windows 825 and 925 of FIGS. 8 and 9. The response code error window 1125 displays code errors (404, 302 and 500 errors in this example) as well as a page count listing the number of pages that suffer from each of the errors. The response code error window 1125 also lists a change in the page count since the last software update. The change number serves as a warning to the user that some pages of the website that have been changed recently have resulted in an increase in the page response errors.

A user can view the pages that suffer from the individual response code errors by clicking on the page count for one of the response code errors. FIG. 11 shows a 404 error window 1150 that results from a user clicking on the "18" page count of the 404 error in the response code error window 1125. The 404 error window 1150 lists a site listing 1155 that lists each page suffering from a 404 error. The user can click on the individual page entries in the site listing 1155 in order to bring up a listing of the errors for that page. This allows the user to quickly identify the problem pages that have failed the audit check in order to fix the problems.

Figure 12:
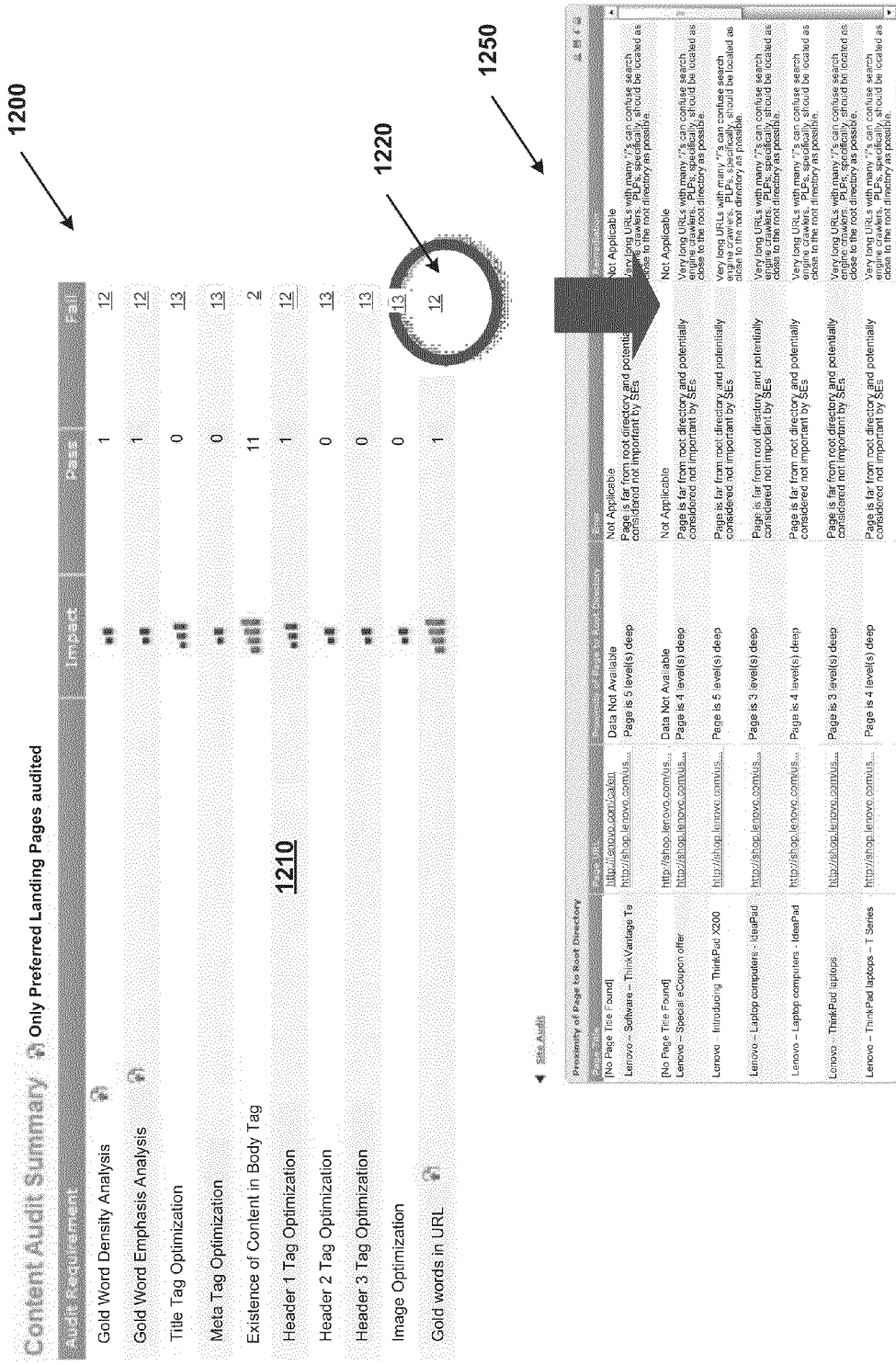
FIG. 12 shows a content audit summary screen listing a summary of content audit information compiled by the Continuity Management system in accordance with the disclosure.

FIG. 12 shows a content audit summary screen 1200 listing a summary of content audit information 1210 reported to a user upon completion of an audit of a website. As part of an audit the Portfolio Management system conducts a content audit by calculating a content score for a website, as discussed above. The content audit summary screen 1200 displays an impact icon (one, two, three or four columns in this example) illustrating which of a plurality of audit requirements will result in small to large increases (four levels of impact are shown in FIG. 12) in the audit score for the website. The content audit summary screen 1200 also lists the number of web pages (preferred landing pages only in this example) that pass and/or fail each audit requirement.

The content audit summary screen 1200 provides a unique way for a user to identify which web pages of the website pass and/or fail each of the content audit requirements. In this example, the web page failure count in the "Fail" column is a hyperlink 1220 that is linked to a recommendation list screen 1250 that displays recommended actions that the user can take to improve the content score for each web page that failed the type of audit requirement that the hyperlink 1220 was linked with. In this example the hyperlink icon 1220 is linked with a requirement that Gold words (keywords) are included in the URL for a web page. In this example, many of the errors involve the keyword being too many levels deep in the URL from the preferred landing page or root directory. The user will get different recommendations when clicking on the hyperlink icons 1220 of the other audit requirements.

Adapting the Audit Score Algorithm

As described above, the audit score is a combination of the weights and values listed in Table 1 which can include one or more of the combinations listed in Table 2. The audit score is used as an indication of how high a website will rank in an organic listing of websites as compiled by a search engine. As such, the audit score algorithm can be tuned using statistical analysis, for example, to be an efficient indicator of where in an organic list of sites a search engine will place the website.

The statistical analysis can include a Monte Carlo style analysis that randomly, or pseudo-randomly, chooses various combinations of scored representations $V_i$ and weights $w_i$ from Table 1 to create trial audit score algorithms. For each set of random variables, the Monte Carlo analysis calculates audit scores for a large set existing websites, each website with one or more PLPs (preferred landing pages) and calculates an R-Squared ($R^2$) value for each trial audit score algorithm indicative of how the audit score algorithm predicts the rank of the PLPs of a website in an organic listing of search results for various Search Engines.

R-Squared is a statistical term indicating how good one term is at predicting another. If R-Squared is 1.0 then given the value of one term, you can perfectly predict the value of another term. If R-Squared is 0.0, then knowing one term doesn't not help you predict the other term at all. More generally, a higher value of R-Squared means that you can better predict one term from another. After analyzing many thousands of random trial audit score algorithms, the one with the highest R-Squared value between website audit score and PLP rank can be chosen.

Figure 13:
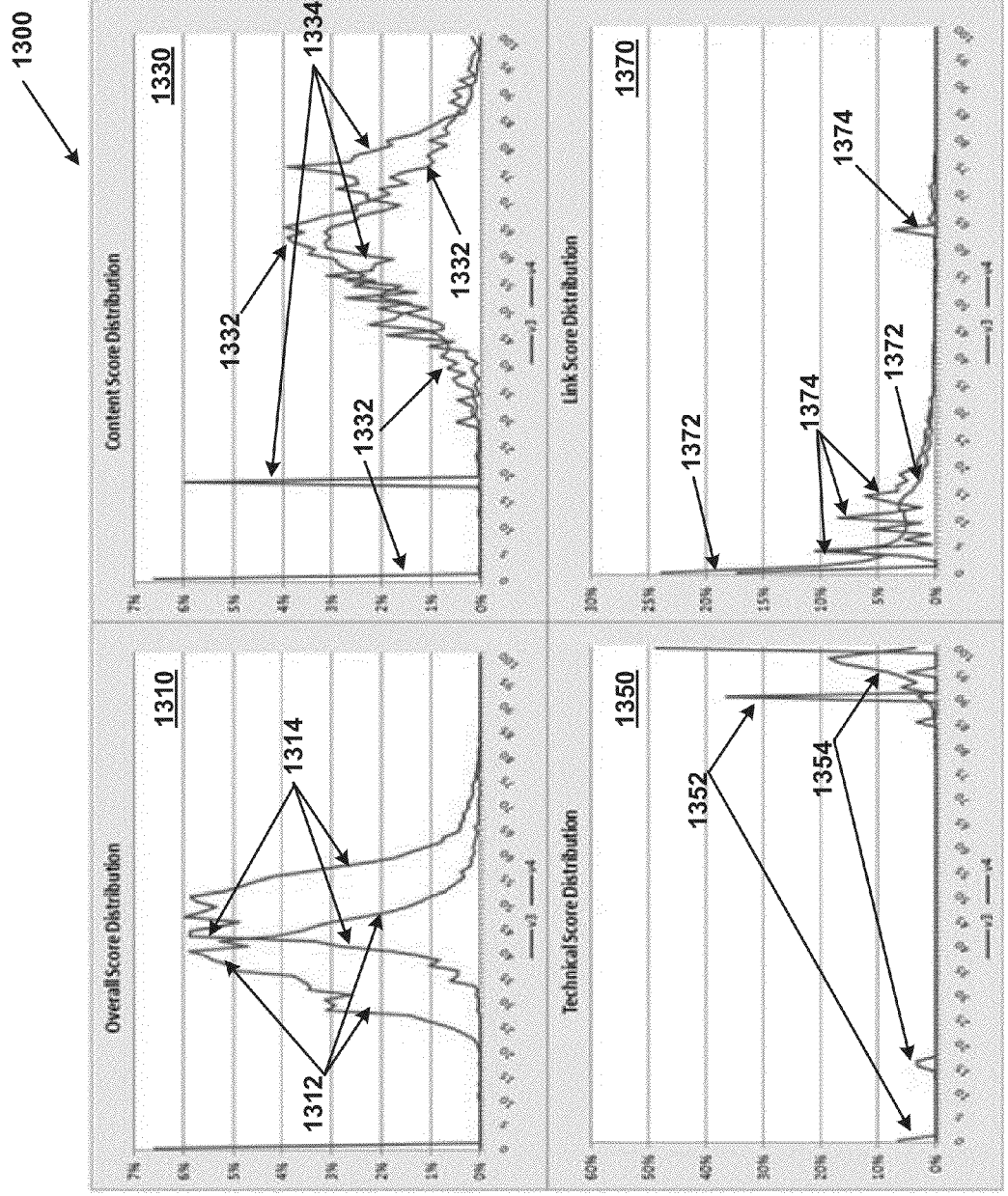
FIG. 13 shows comparative distributions of audit scores for an original audit score algorithm and an updated audit score algorithm as determined using a Monte Carlo analysis.
Figure 14:
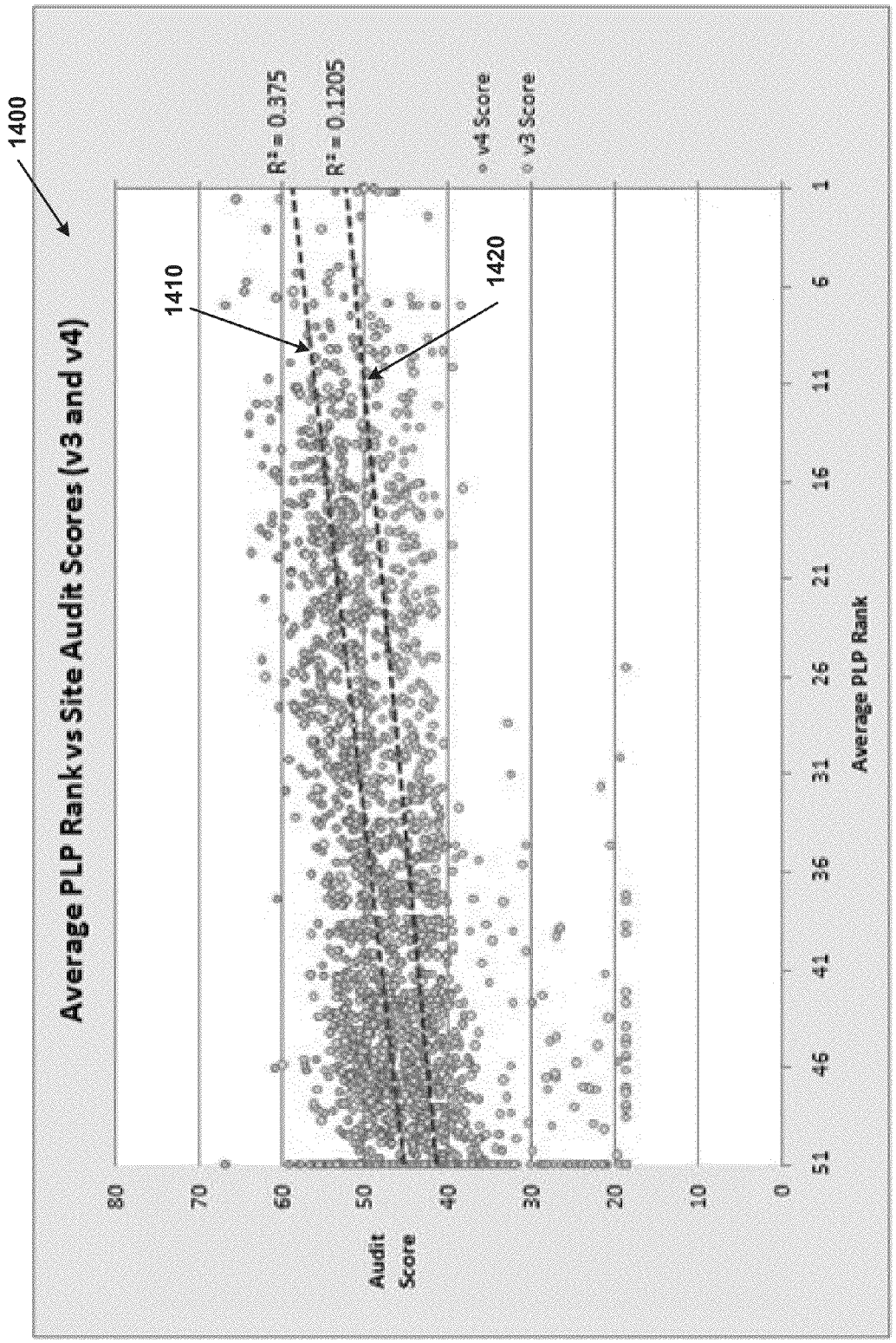
FIG. 14 shows results of a statistical analysis using R-Squared for updating an audit score algorithm in accordance with the disclosure.

Since the audit score algorithm is developed based on certain search engine algorithms, when the search engine algorithms change, it can be desirable to modify the audit score algorithm based on the updated search engine algorithms. FIGS. 13 and 14 illustrate results of a Monte Carlo analysis used to update an audit score algorithm. FIG. 13 shows comparative distributions of an overall audit score, a content score, a technical score and a link score for an original audit score algorithm (labeled v3) and an updated audit score algorithm (labeled v4) as determined using a Monte Carlo analysis. The audit score distributions shown in FIG. 13 are audit scores for individual PLPs (preferred landing pages) of a website. The audit scores shown in FIG. 14 are overall audit scores for an entire group of websites, each of the websites in the group including one or more PLPs.

Referring to FIG. 13, a screen 1300 includes an overall score distribution chart 1310, a content score distribution chart 1330, a technical score distribution chart 1350 and a link score distribution chart 1370. In each of the charts 1310, 1330, 1350 and 1370, the y-axis lists the number of occurrences of a given audit score and the x-axis lists the audit scores on a scale from 0-100. The overall score distribution chart 1310 shows an original overall score distribution 1312 and an updated overall score distribution 1314. The content score distribution chart 1330 shows an original content score distribution 1332 and an updated content score distribution 1334. The technical score distribution chart 1350 shows an original technical score distribution 1352 and an updated technical score distribution 1354. The link score distribution chart 1370 shows an original link score distribution 1372 and an updated link score distribution 1374.

In the example shown in FIG. 13, the changes from the original audit score algorithm v3 to the updated audit score algorithm v4 include the following:
1. Adding page load time (see $V_{35}$ and $W_{35}$ in Table 1) as a value.
2. Remove a check for a Site Map (see $V_1$ and $W_1$ in Table 1) from the algorithm.
3. Change the weightings of the directory related checks (see $W_2$-$W_5$ in Table 1).
4. Change the weightings of the page related checks (see $W_6$-$W_{10}$ in Table 1).

The distributions 1310, 1330, 1350 and 1370 alone are not a useful indicator of whether an audit score algorithm is a good predictor of where a website or PLP will place in an organic listing of a Search Engine. As discussed above, the R-Squared measure is a useful indicator for determining the effectiveness of one term in predicting another term. FIG. 14 shows results of the statistical analysis discussed above using R-Squared for updating the audit score algorithm. FIG. 14 shows a comparison of average PLP rank (see FIG. 5 for an example of PLP rank) versus site audit score for all PLPs contained in a group of websites with a given overall audit score (i.e., the site audit score). In the example shown in FIG. 14, a page audit score is determined for each page in a website using the v3 and v4 audit score algorithms represented by the distributions of FIG. 13. In this case the overall page audit score is a linear combination of the page content score, the page technical score and the page link score. The site audit score (represented by the y-axis of FIG. 14) is determine based on a weighted combination of inbound link analysis values (see $V_{26}$-$V_{32}$ in Table 1) to the website and the average page audit score of pages in the website.

A first linear function 1410, that was determined, e.g., using least squares, for the PLP ranks versus the site audit scores for the v4 algorithm, is shown in FIG. 14. The first linear function 1410 results in an R-Squared value of 0.375 in regards to predicting PLP rank for a given site audit score. A second linear function 1420, that was determined, e.g., using least squares, for the PLP ranks versus the site audit scores for the v3 algorithm, is also shown in FIG. 14. The second linear function 1420 corresponds to an R-Squared value of 0.1205 in regards to predicting PLP rank for a given site audit score. In this example, the v4 algorithm is three times better (0.375/0.1205>3) at predicting the PLP rank of a page in a website base on the website's site audit score.

The audit score updating discussed in reference to FIGS. 13 and 14 can be conducted periodically or when it has been determined that one or more Search Engines of interest have significantly changes the algorithms use to place PLPs in the organic search results.

Trend Reporting

As discussed above, the reports generator module 292 tracks certain KPIs for a website and displays these KPIs in the trend snapshot window 810. The reports generator module 292 can be configured to track these KPIs over time. If one of the KPIs changes by more than a user selectable threshold, the reports generator module 292 can automatically produce the screen 800 including the PLP rank/trend focus window 815 which displays a focused time history 820 for the KPI that changed by more than the threshold overlayed on the PLP ranks 822. This automatic notification can alert the user as to when something has changed in the website or with Search Engines that has significantly affected the certain KPI.

Upon being notified by the reports generator module 292 that a trend of one of the KPIs has changed, the user can do further investigation to determine what affected the change. The change could be determined to be a modification of one of the pages of the website. Alternatively, the change could be a change in keywords of competitors or a change in a search algorithm used by the Search Engines. Such instant notification can provide the user with an advantage in responding timely to the change.

The user selectable threshold(s) used for the KPI trend reporting can include positive thresholds and negative thresholds. For example, the user can choose to be notified of a positive change or a negative change in any KPI including, but not limited to, audit score, average organic search listing rank, inbound traffic volume, query volume or inbound link count.

The user can highlight one of the KPI time histories 812 in order to change the focused time history 820. The columnar PLP ranks 822 are divided into three groups, a high ranking group of the pages that rank in positions 1-5, a medium ranking group for the pages in positions 6-20 and a low ranking group for the pages that rank 21 and higher. The columns of the PLP rankings 822 are sized to show the percentage of key words in the defined group of keywords that each of the high, medium and low ranking groups include. The key word percentage scale is located on the left side of the graph.

The focused time history 820 is a time history of one of the trends listed in the trend snapshot window 810. The user determines which of the metrics in the trend snapshot window 810 is displayed with the focused time history 820 by highlighting that trend in the trend snapshot window 810. In this example, the audit score metric is highlighted. The user can change which metric is displayed with the focused time history 820 by highlighting that metric. The combination of the PLP ranks 822 and the focused time history 820 provides the user with a comparative glimpse of how the website being managed is doing in comparison to the other websites in the PLP rankings. The size of the PLP ranking columns 822 provides the user with an estimate of the percentage of keywords in the defined keyword space needed to get into the high ranking group (or the medium or low ranking groups).

Social Media Insight

Social networks have become a very powerful source for spreading information. Discussions on social networks such as Facebook®, YouTube®, Twitter® and various blogs can be another form of advertisement for a website. In some aspects, the solution 290 can include a Social Media Insight (SMI) system that gathers information from social networks and presents information to the user regarding how often and in what context the website being monitored is being discussed in social network discussions. In these aspects, the data retrieval module 291 is configured to retrieve data indicative of this information and the reports generator module 292 is configured to compile the information into useful indicators that the user can understand. Using the indicators provided by the SMI system, the user can modify the content and keywords, for example, of the website, based on the context of the discussions. For example, the user can add new keywords to a pay-per-click (PPC) strategy or add the new keywords to pages of the website to improve search results.

The SMI system can monitor multiple social networks and provide feedback for each of the social networks separately. The feedback can include, for example, a number of followers of discussions mentioning the website (or product of interest), the sentiment of the discussions (e.g., positive, neutral and/or negative), the number of mentions of keywords (so called "Buzz") and the number of user engagements (e.g., Facebook® Likes®, Twitter® Tweets®, Google®+1s®, comments, video views, etc.) with and/or about the website and/or products associated with the website.

Figure 16:
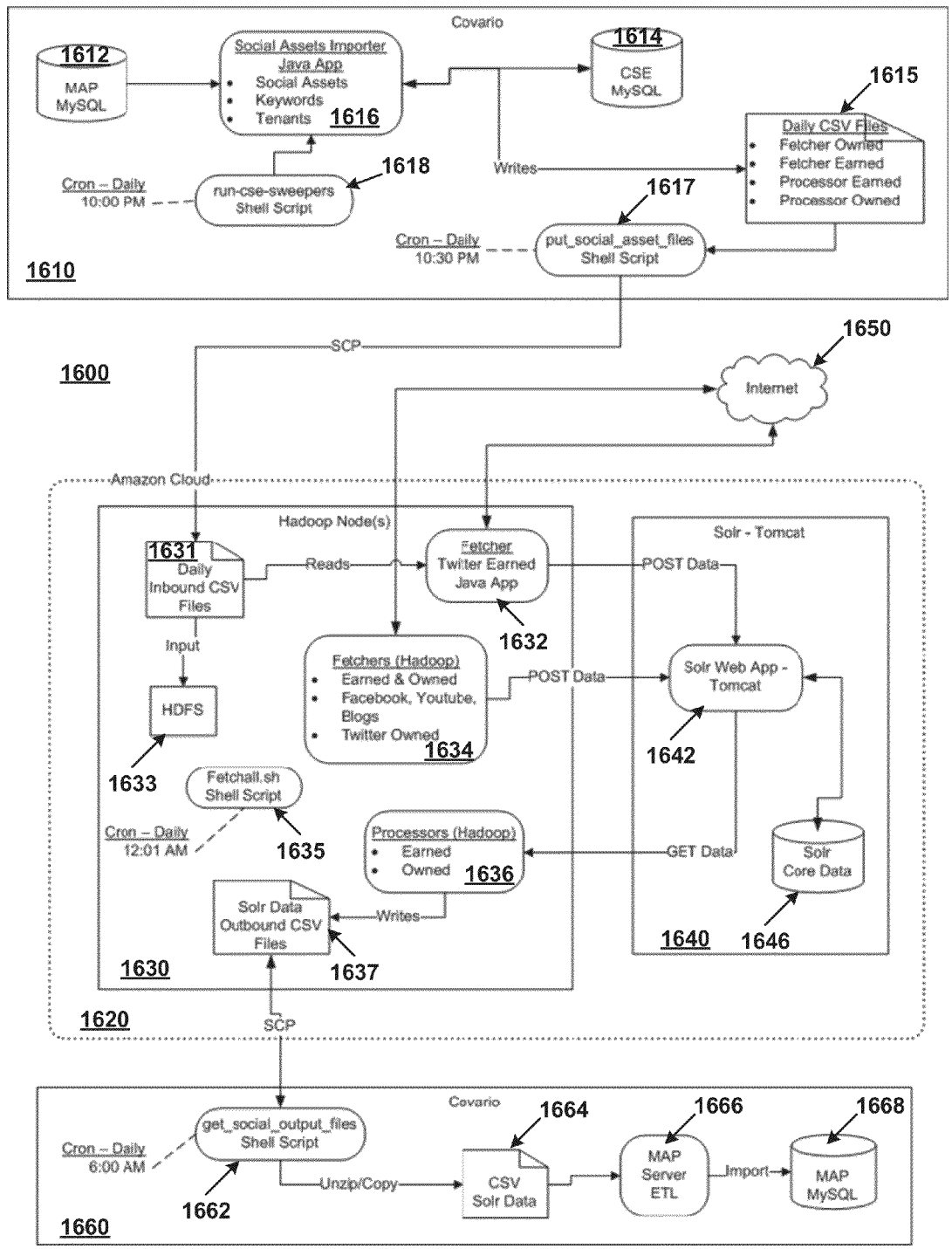
FIG. 16 shows an exemplary block diagram of an exemplary architecture of a system for auditing social media websites to obtain feedback regarding a website being monitored by the search engine optimization system in accordance with the disclosure.

FIG. 16 shows an exemplary block diagram of an architecture for a SMI system 1600 for auditing social media networks to obtain feedback regarding a website being monitored by the search engine optimization system in accordance with the disclosure. The SMI system 1600 includes a pre-processing system 1610, a cloud computing system 1620 and a post-processing system 1660. The pre-processing system 1610 and the post-processing system 1660 can be part of the analysis system 140 of FIG. 2, for example.

The cloud computing system 1620 can be any computing system with access to social media services and the related information. For example, the cloud computing system 1620 could be part of the Amazon Elastic Compute Cloud (EC2)® using the Apache Hadoop® open source file system, and the Apache Solr® open source enterprise search platform running on the Apache Tomcat® open source web server and servlet container. The exemplary SMI system 1600 includes one or more Hadoop® nodes 1630 and a Solr®/Tomcat® node 1640.

The pre-processing system 1610 includes a tenant database 1612 that includes tenant specific data files. The tenant specific data files can include lists of keywords and corresponding web pages for tenant websites. The pre-processing system 1610 also includes a combined database 1614 that includes social assets for all tenants being served by the SMI systems

1600. The social assets for all tenants can be a collection of specific engagements of gold words that have been collected in audits of social media websites for all the tenants being served by the SMI system 1600.

The pre-processing system 1610 creates audit jobs, e.g., periodically, such as daily, for example, to collect social media engagement data. In the exemplary pre-processing system 1610, a "run-cse-sweeper" shell script (referred to as the run shell script from herein) 1618 utilizes cron to schedule and run the periodic audit jobs. The run shell script 1618 is communicated to a social assets importer module 1616 based on the periodic schedule. In the example of FIG. 16, the run shell script 1618 is scheduled to run daily at 10:00 PM.

Upon receiving the run shell script 1618, the importer module 1616 retrieves data from the tenant database 1612 and the social assets database 1614 in order to create an audit job. The data from the tenant database 1612 includes keywords that a tenant has chosen for each page of a website. The data retrieved from the social assets database 1614 includes a list of social assets owned or earned by the tenant on various social networks or blogs. An owned social asset is an account or page owned by the tenant. For example, an owned asset may be one or more tenant sponsored discussion pages on a social media site such as Twitter®, Facebook®, YouTube® or blogs. An earned asset could be a discussion page on a social media website or blog that was created by outside activity such as public discussions. In one embodiment, the importer module 1616 is configured to create separate audit jobs for owned assets and earned assets. The importer module 1616 also creates a separate audit job to retrieve account-level analytics data for each tenant.

Upon receiving the runs shell scripts 1618 and retrieving the data from the databases 1612 and 1614, the social assets importer module 1616 writes an audit job in an audit job queue 1615. The audit jobs in the job queue 1615 include the necessary information to utilize separate instances of fetcher jobs and Hadoop processor nodes for each audit job in the queue. As discussed above, the audit jobs include separate audit jobs (both fetchers and processor nodes) for owned assets and separate jobs for earned assets.

A put_social_assets_files shell script 1617 (referred to from herein as a put shell script) retrieves the audit jobs in the job queue 1615 and submits the audit jobs to the cloud computing system 1620 via a secure copy (SCP) command. An inbound jobs queue 1631 receives the jobs form the put shell script 1617. The jobs received by the inbound jobs queue 1631 are stored in a Hadoop Distributed File System (HDFS) 1633.

When jobs are received in the inbound jobs queue 1631, fetch jobs are created periodically based on a Fetchall.sh shell script 1635 for each of the jobs. When the scheduled time for a job arrives, the selected Fetchall.sh shell script 1635 is executed causing one or more instances of fetch jobs (1632 and 1634 in this example) to be executed on Hadoop processors 1636. The inputs to the fetch jobs comprise the keywords and owned assets specified in an Owned_Accounts.CSV files submitted to the inbound jobs queue 1631.

A first fetch job 1632 comprises a Java application configured to search for earned assets on Twitter only. The first fetch job searches the internet 1650 for Twitter feeds that are earned. In other words, the Twitter feeds are not sponsored by the tenant, but are public feeds that include the keywords included in the Twitter feeds. The first fetch job 1632 is a public job for anyone posting on Twitter for a given topic/keyword whereas a second fetch job 1634 is authorized by the client.

The second fetch job 1634 is configured to search the internet 1650 for both earned and owned assets on specified social networking sites. The second fetch job 1634 searches for earned and owned assets on Facebook, YouTube and Blogs, in this example, and searches for owned assets only on Twitter.

The first and second fetch jobs 1632 and 1634 are made up of three main sub-processes comprising:
 1. An account level analytics retrieval sub-process;
 2. A social asset fetcher sub-process; and
 3. An earned asset fetcher sub-process.

Based on the social assets (e.g., Facebook® pages, Twitter® feeds, YouTube® channels, etc.) listed in the Owned_Accounts_CSV, the account level analytics retrieval process collects overall statistics about the account from Facebook, Twitter, and/or YouTube etc.. The analytics retrieval job ignores blog entries. The statistics collected by the account level analytics retrieval process include the number of followers of a particular social feed, a number of posts mentioning keywords of the particular social feed, and a number of engagements (e.g., Likes, ReTweets) with the social feed. The statistics collected by the fetch jobs 1632 and 1634 are posted to an instance of a Solr application 1642 running on a Solr®/Tomcat® node 1640. An exporter job portion of the fetch jobs 1632 and 1634 converts the data from the Hadoop sequence file format to CSV format and stores the CSV files in an outbound Solr data queue 1637.

The social asset fetcher sub-process searches the internet 1650 for posts and comments in the social assets ((Facebook page, Twitter feed, YouTube channel, blog) listed in owned_account.csv. The social asset fetcher sub-process collects the most recent posts and comments and stores them in the Solr core database 1646 for the tenant of the account. The posts and comments include those for that tenant's owned Twitter, Facebook, and YouTube accounts, and those posts and comments for both earned and owned blogs. For posts and comments it has fetched in the past, the social asset fetcher sub-process calculates the differences in values to determine the delta values for numbers of comments, retweets, likes, dislikes, video views, etc.

Upon collecting the posts and comments and posting the posts and comments to the Solr core database 1646, for each tenant/asset/keyword specified in an owned_keyword.csv file, the social asset fetcher sub-process queries the Solr core for that tenant to find all posts matching the keyword(s) and aggregates the delta values for the different statistics (number of followers, a measure of sentiment, and a number of engagements). The social asset fetcher sub-process also takes the owned_keyword.csv, finds all posts for a given account matching the keywords, and uses that list to find the posts for that account that do not match any keywords. The aggregated delta values from these non-matching posts are stored in a No_Keyword_match portion of the account's social_owned_keyword.csv files. The social asset fetcher sub-process also resets to 0 the delta values for the posts in the accounts it has processed. The social asset fetcher sub-process also runs an export process twice, once for the owned asset results and once for the non-matching keyword results. The export process converts the results data from Hadoop sequence files to CSV files in the outbound Solr data queue 1637.

The social asset fetcher sub-process searches the internet for earned keywords listed in an input file named earned_fetcher.csv. Earned keywords are words that show up in a high volume that are not currently listed in the list of keywords for the website. In one embodiment, the social asset fetcher sub-process queries YouTube and Facebook for videos and posts that match the keywords in earned_fetcher.csv file. The social asset fetcher sub-process also collects posts from earned blogs for the keywords in earned_fetcher.csv file. The identified posts and videos are stored on the Solr core database 1646. In one embodiment, these identified posts and videos are not separated by tenant when stored in the Solr core database 1646, but are all stored in the same cores for all the common earned data. The earned Twitter data is collected by a separate process, the first fetcher fob 1632, that runs continuously.

The earned asset fetcher sub-process queries the Solr core database 1646, for each tenant/asset/keyword line in owned_keyword.csv, for each source (YOUTUBE, TWITTER, FACEBOOK, BLOG) to find all posts matching the keyword and aggregates the values for the different statistics (number of followers, a measure of sentiment, and a number of engagements). The earned asset fetcher sub-process converts the results data from Hadoop sequence files to CSV files and stored in the outbound Solr data queue 1637. Note that because earned blogs are fetched by the social asset fetcher sub-process rather than the earned asset fetcher subprocess, the social asset fetcher sub-process is run prior to the earned asset fetcher sub-process.

Upon completion of the fetch jobs, the post-processing system 1660 runs a get_social_output_files shell script 1662 to secure copy the data stored in the outbound Solr data queue 1637. The get_social_output_files shell script 1662 is scheduled to run based on a cron job scheduler. In this embodiment, the get_social_output_files shell script 1662 runs daily at 6:00 AM. The get_social_output_files shell script 1662 unzips and copies the Solr data retrieved from the outbound Solr data queue 1637 and creates a set of Solr data CSV files 1664. The get_social_output_files shell script 1662 splits the Solr data on a tenant by tenant basis and creates a server folder 1666 (labeled MAP Server ETL in FIG. 16). The server folder 1666 contains separate folders for each tenant. The get_social_output_files shell script 1662 then imports the tenant folders into a tenant database 1668. The tenant database 1668 can be the same as the tenant database 1612 in the pre-processing server 1610.

The social media data imported from the Solr database into the tenant database 1612 is used by the reports generator module 292 to create the display 1500 as shown in FIG. 15 and discussed above. In addition, the imported data can be used to display other social media related displays to the user.

Figure 17:
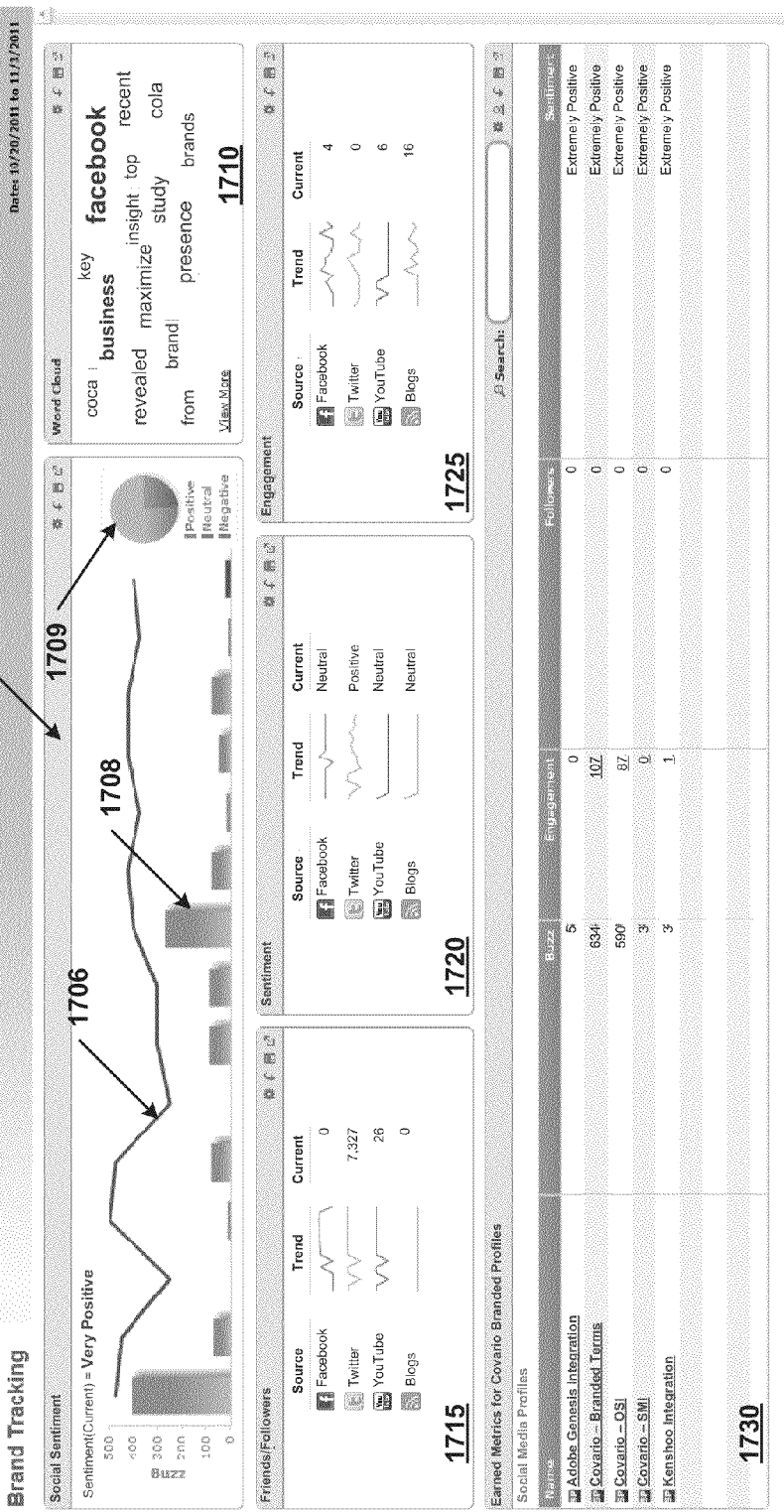
FIG. 17 shows another user interface screen displaying results of an audit of social media websites, the results being indicative of feedback regarding a website being monitored by the search engine optimization system in accordance with the disclosure.

FIG. 17 shows a first user interface screen 1700 displaying results of an audit of social media performance. The reports generator module 292 creates the screen 1700 using the data stored in the tenant database 1668. The screen 1700 can be created in response to a user input. The screen 1700 includes several windows including a time history window 1705, a word cloud window 1710, a friends/followers window 1715, a sentiment window 1720, an engagement window 1725 and a social media profiles window 1730.

The time history window 1705 shows a timeline 1706 that represents a sentiment (also known as "Buzz") score for a website. The Buzz timeline 1706 represents a score of social media sentiment that is similar to the audit score discussed above. However, the factors that go into the social media sentiment score of timeline 1706 include the number of times that a product or service of the website is mentioned in social media pages or blogs. The social media sentiment score can be calculated using the values $V_{36}$ and weight $W_{36}$ shown in Table 1 above. For example the social media sentiment score could be calculated by summing all the values of $V_{36}$ for positive ($V_{36}=1.0$), neutral ($V_{36}=0.5$) and negative ($V_{36}=-1.0$) comments for all instances where keywords specified in the word cloud 1710 are mentioned in social media pages and/or blogs (both owned and earned), weighting the sum by the weight $W_{36}$ and dividing by the total number of instances, as follows:

$$\text{Sentiment/Buzz} = \text{Sum}(V_{36}) * W_{36}/(\text{No. of Instances}) \quad (1)$$

In this example, $W_{36}$ is 1, so the Buzz score timeline 1706 can have a maximum value of +1.0 (all positive) and a minimum value of −1.0 (all negative). The scale for the sentiment/buzz score timeline is not shown on the exemplary time history window 1705. The sentiment/buzz score given by equation 1 is not affected by the number of instances. However, other embodiments could increase the sentiment/buzz score for larger numbers of instances. The sentiment/buzz score timeline 1706 can provide the user with an indication of whether the website is improving or not in discussions on social media pages and blogs.

The time history window 1705 also shows color coded columnar icons 1708 representative of the number of positive, neutral and negative instances that keywords are mentioned in social media pages and/or blogs for fifteen time periods (e.g., 15 hours, 15 days, 15 weeks, etc.). A pie chart 1709 shows similarly colored wedges showing the breakdown of positive, neutral and negative instances. The columnar icons 1708 provide the user with an indication of the volume of traffic that the social media pages and blogs are experiencing as well as an indication of the percentages of positive, neutral and negative sentiments. The time history window 1705 can also be changed by the user using a pulldown menu (not shown) to display other measures such as, for example, the number of friends/followers or the number of engagements.

The word cloud window 1710 shows the listing of targeted keywords selected by the client for the website of interest. In addition the word cloud window 1710 can display keywords that are not targeted by the client. The size of a font of a word in the word cloud window is larger for words that are mentioned more often in the social media pages and blogs, thereby being an indicator of relative frequency or popularity of keywords. This variable font size shows the user which words are most popular and which words are less popular. The user can toggle the word cloud window 1710 to display all keywords, only targeted keywords or only non-targeted keywords, e.g., using a mouse input.

The friends/followers window 1715 shows a trend timeline and a current count for the number of followers of social media pages (Facebook, Twitter, YouTube and Blogs in this example) in the last day, week or month, for example, as determined by the user. The sentiment window 1720 shows a trend timeline and a current overall sentiment (based on the sentiment/buzz score discussed above) for select social media pages (Facebook, Twitter, YouTube and Blogs in this example).

The engagement window 1725 shows a trend timeline and a current number of engagements in that last day, week or month, for select social media pages (Facebook, Twitter, YouTube and Blogs in this example). In this example, engagements include likes, tweets and the like for the different social media pages. By showing different trend timelines for each social media page and blog, the user can be provided with indications of which social media pages are most important currently or which social media pages need more attention to attract more followers.

The social media profile window 1730 shows breakdowns of the sentiment/buzz instances, number of engagements, the number of followers, and the sentiment/buzz score of different social media profiles that the user is tracking for the website of interest. The social media profiles listed in the profile window 1730 include different subsets of the keywords and owned/earned social media pages and blogs that are being tracked by the social media insight system. By using different profiles, a user can be informed of how different keywords/social properties are attracting followers and how the sentiment of these properties varies.

Figure 18:
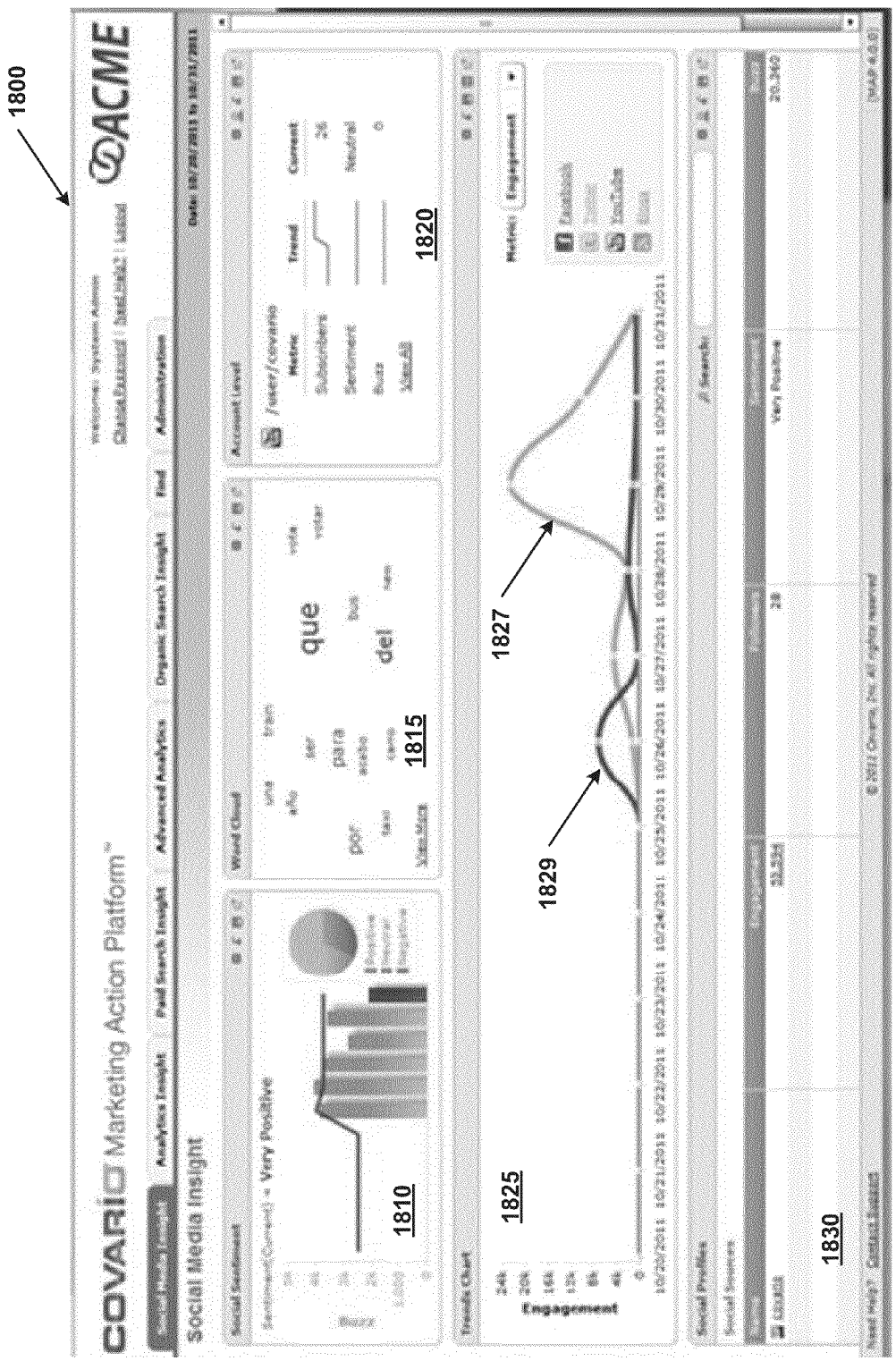
FIG. 18 shows yet another user interface screen displaying results of an audit of social media websites, the results being indicative of feedback regarding a website being monitored by the search engine optimization system in accordance with the disclosure.

FIG. 18 shows a second user interface screen 1800 displaying results of an audit of social media websites. The screen 1800 is a different layout than the screen 1700 discussed above. The screens 1700 and 1800 are user configurable and the different windows (or portlets) can be resized and moved to suit the user. The screen 1800 includes a small time history window 1810 (similar to the time history window 1705, but smaller), a word cloud window 1815, an account level metrics window 1820, a trends chart 1825 and a social profiles window 1830 (similar to the social profiles window 1730).

The account level metrics window 1820 shows trend timelines and current measurements for number of subscribers, sentiment score and number of instances (buzz) that keywords are mentioned in social media pages and/or blogs.

The trends chart 1825 shows timelines 1827 and 1829 for a selected metric (number of engagements in this example) for separate social media pages and blogs. By showing different trend timelines for each social media page and blog, the user can be provided with indications of which social media pages are most important currently or which social media pages need more attention to attract more followers.

Change Tracker

Figure 19:
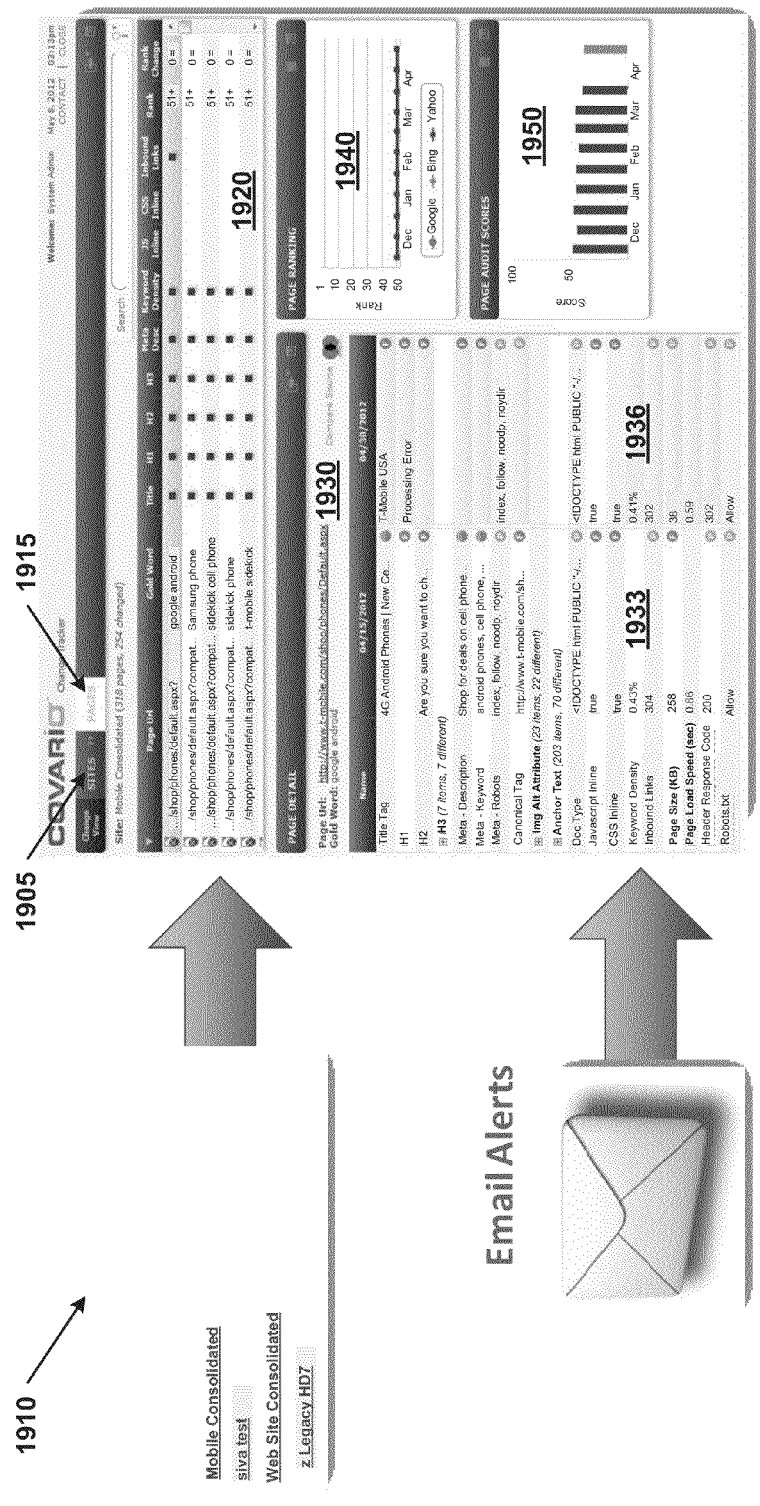
FIG. 19 shows a user interface screen displaying an alert regarding changes in various characteristics of a website, the alert being generated by a Change Tracker system in accordance with the Disclosure.

FIG. 19 shows a user interface screen 1900 displaying changes in various characteristics of a website as determined by a Change Tracker system. The Change Tracker system monitors various metrics, as determined by the user, for a website. When a given metric changes by more than a threshold value, the Change Tracker system generates an alert and communicates the screen 1900 to the user. The screen 1900 can be included in an Email or other message or automatically displayed on a display screen of a user computer. The user inputs the threshold values for the metrics that will generate an alert.

The screen 1900 is a page level screen that corresponds to one or more pages included in a site list 1910. The screen 1900 is displaying a page level window 1915 selected from the site list 1910. The screen 1900 could also be changed to a sites level window by the user clicking on a sites tab 1905. In this way, the user can be tracking multiple websites with multiple pages per website.

An alert window 1920 displays color coded icons for various scored representations that are being tracked in the audit score. A red icon can indicate a specific scored representation that changed and resulted in the alert being generated.

A page detail window 1930 lists values of user selected metrics that are being tracked to generate alerts. A first sub-window 1933 lists values for the metrics for a past time period and a second sub-window 1936 lists values for the metrics for a current time period in which the alert was generated.

A page ranking window 1940 lists a time history of search engine rank for three search engines (Google, Bing and Yahoo or others, as determined by the user), in this example. More than three search engine ranks can be displayed in other embodiments. A page audit score window 1950 lists a time history of audit scores for the page.

By tracking metrics and audit scores on an ongoing basis, the Change Tracker system is able to alert the user immediately when an audit score or other metric changes significantly. In this way, the user can take corrective action in a fast and efficient manner. The user can identify what change has occurred, based on the alert window 1920 and the page detail window 1930. Upon receiving an alert including the screen 1900, a user can be informed of a change to the source code of the website including summarized changes and relate these changes to the technical, content and link metric portions of the audit scores. The user can then take corrective action to remedy the problem(s) indicated by the screen 1900.

The disclosed exemplary systems and methods have been described above with respect to the analysis system 140 and/or the client 130. One of skill in the art will appreciate alternative embodiments wherein the functions of the analysis system 140 are performed on other devices in the networked system 100.

Those skilled in the art can readily recognize that numerous variations and substitutions may be made in the disclosed embodiments to achieve substantially the same results as achieved by the embodiments described herein. Accordingly, there is no intention to limit the disclosure to the disclosed exemplary forms. Many variations, modifications and alternative constructions fall within the scope and spirit of the disclosure as expressed in the claims.

What is claimed is:

1. A non-transitory computer-readable storage medium comprising a plurality of program codes executable by a processor for implementing a method for optimizing a website, the plurality of program codes including codes for:
   acquiring data associated with the website;
   identifying, based upon the acquired data, sections of the website to be modified to improve an audit score associated with the website wherein the identifying includes:
      identifying first keyword spaces including one or more defined keywords, wherein the identifying the first keyword spaces is based on an amount of referral traffic associated with each of the first keyword spaces to the website and competitor websites,
      identifying one or more second keyword spaces of the first keyword spaces, the second keyword spaces being characterized in that no competitor sites control more than a first threshold amount of the associated referral traffic, and
      identifying one or more sections of the website to be modified based upon at least one of:
         one or more keywords included within one or more of the second keyword spaces; and
         the amount of the referral traffic.

2. The non-transitory computer-readable storage medium of claim 1 wherein the codes further include codes for generating, subsequent to modification of one or more of the sections of the website, a first audit score wherein the first audit score is based upon at least one of:
   a first scored representation based upon one or more technical metrics,
   a second scored representation based upon one or more content metrics, the content metrics including the one or more defined keywords, and
   third scored representation based upon one or more link metrics.

3. The non-transitory computer-readable storage medium of claim 1 wherein the codes further include codes for determining a priority for each of the one or more sections of the website identified to be modified based on at least one of the amount of referral traffic to competitor sites and the amount of referral traffic to the sections of the website identified to be modified.

4. The non-transitory computer-readable storage medium of claim 1 wherein the codes further include codes for displaying the one or more sections of the website identified to be modified.

5. The non-transitory computer-readable storage medium of claim 4 wherein the codes further include codes for receiving a user input selecting one of the one or more sections of the website in the display and responsively displaying a list of recommended modifications to the selected section.

6. The non-transitory computer-readable storage medium of claim 2 wherein the codes further include codes for:
generating the first scored representation based upon one or more types of code errors detected in pages of the website; and
displaying a page count for each of the one or more detected types of code errors; and
displaying, in response to a user input selecting a first one of the one or more detected types of code errors, a list of pages in which the selected type of code error was detected.

7. The non-transitory computer-readable storage medium of claim 2 wherein the codes further include codes for:
displaying a content audit summary screen listing a summary of the content metrics of the second scored representation, the content audit summary screen including one or more impact icons for the content metrics, the impact icons illustrating two or more levels of impact in the second scored representation that could result by meeting a content metric requirement.

8. The non-transitory computer-readable storage medium of claim 1 wherein the codes further include codes for automatically producing an alerting display screen in response to a change in the website affecting the audit score by more than a user-selectable threshold.

9. The non-transitory computer-readable storage medium of claim 8 wherein the change relates to a change in one or more of average organic search listing rank, inbound traffic volume, query volume or inbound link count.

10. A computer-implemented method for optimizing a website, the method comprising:
acquiring data associated with the website;
identifying, using a processor and based upon the acquired data, sections of the website to be modified to improve an audit score associated with the website wherein the identifying includes:
identifying first keyword spaces including one or more defined keywords, wherein the identifying the first keyword spaces is based on an amount of referral traffic associated with each of the first keyword spaces to the website and competitor websites,
identifying one or more second keyword spaces of the first keyword spaces, the second keyword spaces being characterized in that no competitor sites control more than a first threshold amount of the associated referral traffic, and
identifying one or more sections of the website to be modified based upon at least one of:
one or more keywords included within one or more of the second keyword spaces; and
the amount of the referral traffic.

11. The method of claim 10 further comprising:
generating, subsequent to modification of one or more of the sections of the website, a first audit score wherein the first audit score is based upon at least one of:
a first scored representation based upon one or more technical metrics,
a second scored representation based upon one or more content metrics, the content metrics including the one or more defined keywords, and
a third scored representation based upon one or more link metrics.

12. The method of claim 10 further comprising determining a priority for each of the one or more sections of the website identified to be modified based on at least one of the amount of referral traffic to competitor sites and the amount of referral traffic to the sections of the website identified to be modified.

13. The method of claim 10 further comprising displaying the one or more sections of the website identified to be modified.

14. The method of claim 13 further comprising:
receiving a user input selecting one of the one or more sections of the website in the display and responsively displaying a list of recommended modifications to the selected section.

15. The method of claim 11 further comprising:
generating the first scored representation based upon one or more types of code errors detected in pages of the website;
displaying a page count for each of the one or more detected types of code errors; and
displaying, in response to a user input selecting a first one of the one or more detected types of code errors, a list of pages in which the selected type of code error was detected.

16. The method of claim 11 further comprising:
displaying a content audit summary screen listing a summary of the content metrics of the second scored representation, the content audit summary screen including one or more impact icons for the content metrics, the impact icons illustrating two or more levels of impact in the second scored representation that could result by meeting a content metric requirement.

17. The method of claim 10 further comprising automatically producing an alerting display screen in response to a change in the website affecting the audit score by more than a user-selectable threshold.

18. The method of claim 17 wherein the change relates to a change in one or more of average organic search listing rank, inbound traffic volume, query volume or inbound link count.

* * * * *